United States Patent
Cho

(10) Patent No.: US 8,794,786 B2
(45) Date of Patent: Aug. 5, 2014

(54) LIGHTING DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 551 days.

(21) Appl. No.: 13/148,703

(22) PCT Filed: Nov. 17, 2009

(86) PCT No.: PCT/JP2009/069467
§ 371 (c)(1),
(2), (4) Date: Aug. 10, 2011

(87) PCT Pub. No.: WO2010/097994
PCT Pub. Date: Sep. 2, 2010

(65) Prior Publication Data
US 2011/0317090 A1      Dec. 29, 2011

(30) Foreign Application Priority Data
Feb. 25, 2009   (JP) ................................. 2009-042518

(51) Int. Cl.
G02F 1/1335   (2006.01)

(52) U.S. Cl.
CPC ............................ G02F 1/133604 (2013.01)
USPC ............... 362/217.09; 362/221; 362/97.1; 362/631; 362/632

(58) Field of Classification Search
USPC ............... 362/217.09, 217.08, 221, 219, 225, 362/97.1, 97.2, 630, 631, 632, 633, 634
See application file for complete search history.

(56) References Cited

U.S. PATENT DOCUMENTS

| | | | |
|---|---|---|---|
| 7,325,941 B2 * | 2/2008 | Kim et al. ...................... | 362/225 |
| 7,674,006 B2 * | 3/2010 | Lee ................. | 362/225 |
| 7,980,724 B2 * | 7/2011 | Chung et al. ............. | 362/217.14 |
| 8,243,228 B2 * | 8/2012 | Cho ............................... | 349/58 |
| 2007/0230169 A1 | 10/2007 | Kwon et al. | |
| 2008/0218089 A1 | 9/2008 | Takata | |
| 2009/0256789 A1 | 10/2009 | Takata | |
| 2010/0321924 A1 * | 12/2010 | Cho et al. ..................... | 362/97.1 |

FOREIGN PATENT DOCUMENTS

| | | |
|---|---|---|
| JP | 2007-280955 A | 10/2007 |
| JP | 2008-251543 A | 10/2008 |

OTHER PUBLICATIONS

Official Communication issued in International Patent Application No. PCT/JP2009/069467, mailed on Feb. 16, 2010.

\* cited by examiner

*Primary Examiner* — Laura Tso
(74) *Attorney, Agent, or Firm* — Keating & Bennett, LLP

(57) ABSTRACT

The backlight unit 12 includes cold cathode tubes 18, a chassis 14, inverter boards 20, relay connectors 21, and covers 22. The chassis 14 houses the cold cathode tubes 18. The inverter boards 20 are arranged on a side of the chassis 14 opposite from the cold cathode tubes 18. The inverter boards 20 are configured to supply drive power to the cold cathode tubes 18. The relay connectors 21 are mounted to the chassis 14. The inverter boards 20 are connected to or disconnected from the relay connectors 21 in one direction along board surfaces thereof (the X-axis direction). The relay connectors 21 are configured to relay power from the inverter boards 20 to the cold cathode tubes 18. The covers 22 are arranged between the chassis 14 and the inverter boards 20. Each cover 22 includes a movable portion 22b attached to the chassis 14 so as to be movable along the connecting direction and the disconnecting direction of the inverter board 20 to the relay connectors 21 (the X-axis direction).

34 Claims, 22 Drawing Sheets

FIG.1
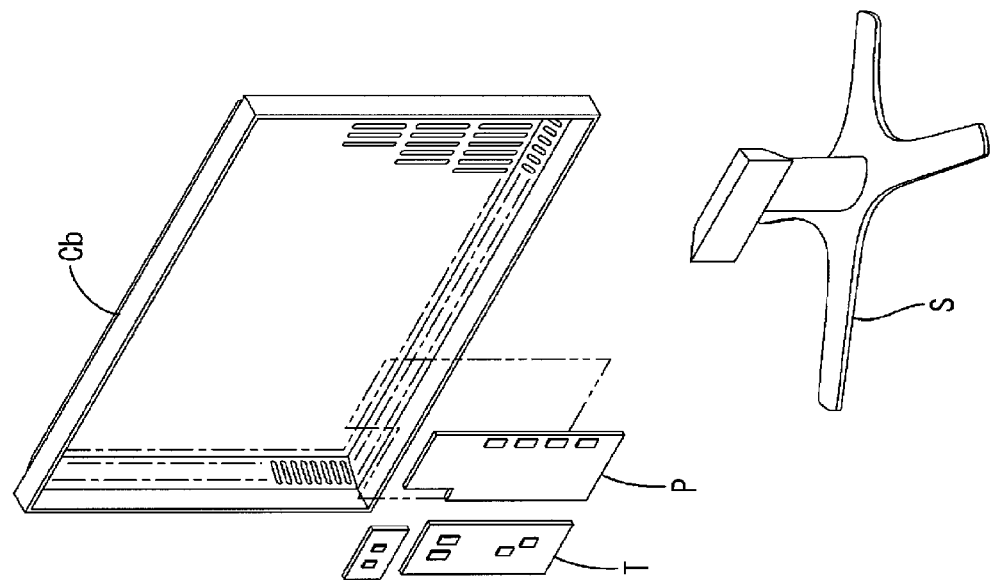
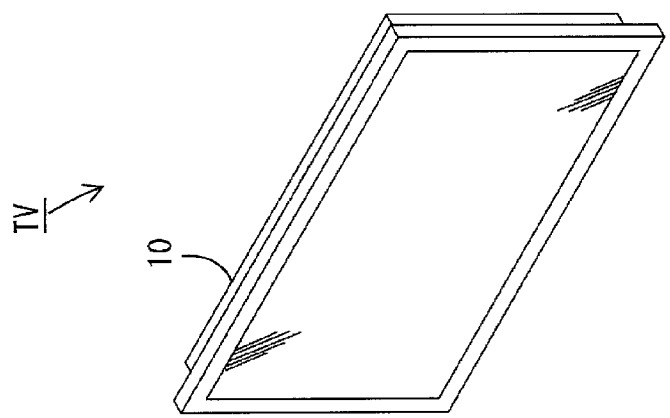
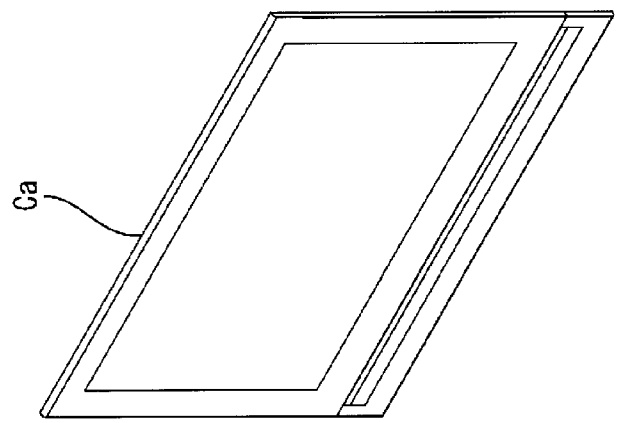

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television receiver does not emit light. Therefore, a backlight unit is required as a separate lighting unit. The backlight unit is arranged behind the liquid crystal panel (on an opposite side from the display surface). It includes a chassis, a number of cold cathode tubes, an optical member and an inverter board. The chassis has an opening in a surface on the liquid crystal panel side. The cold cathode tubes are housed in the chassis. The optical member includes a plurality of pieces (e.g., a diffuser). It is arranged so as to cover the opening of the chassis and configured to effectively direct rays of light emitted from the cold cathode tubes toward the liquid crystal panel. The inverter board is provided for supplying power to the cold cathode tubes.

Patent Document 1 discloses an example configuration for making electrical connection between an inverter board and cold cathode tubes. In this configuration, the cold cathode tubes are arranged on the front side inside the chassis and the inverter board is arranged on the rear side outside the chassis. Relay connectors are mounted to the chassis so as to penetrate through the chassis. The cold cathode tubes are connected to internal ends of the relay connectors. The inverter board is connected to external ends of the relay connectors.

Patent Document 1: Japanese Unexamined Patent Publication No. 2007-280955

PROBLEM TO BE SOLVED BY THE INVENTION

The inventor of the present application suggests a lighting device including a cover between the chassis and the inverter board in addition to the above configuration. With the cover, components mounted on the inverter board do not touch the chassis. The inverter board is connected to the relay connectors after the cover is mounted to the chassis.

During the connection of the inverter board to the relay connectors, the inverter board is held so as to face the chassis and moved toward the relay connectors. Namely, the inverter board is moved relative to the cover. If the components mounted on the inverter board touch parts of the cover during the movement of the inverter board, the components may be damaged.

DISCLOSURE OF THE PRESENT INVENTION

The present invention was made in view of the foregoing circumstances. An object of the present invention is to reduce damage to a power supply board.

Means for Solving the Problem

A lighting device of the present invention includes a light source, a chassis, a power supply board, at least one relay connector, and a cover. The chassis houses the light source. The power supply board is arranged on a chassis side opposite from the light source and configured to supply drive power to the light source. The at least one relay connector is mounted to the chassis such that the power supply board is connected thereto in one direction along a board surface of the power supply board so as to be removable in the direction. The relay connector is configured to relay power supply from the power supply board to the light source. The cover is arranged between the chassis and the power supply board. The cover includes a movable portion attached to the chassis so as to be movable along a connecting direction of the power supply board to the at least one relay connector and a disconnecting direction of the power supply board from the at least one relay connector.

The cover is arranged between the chassis and the power supply board. The power supply board is connected to or disconnected from the relay connector in the direction along the board surface thereof. The cover has the movable portion attached to the chassis so as to be movable along the connecting direction and the disconnecting direction of the power supply board. The movable portion follows the movement of the power supply board for connection to or disconnection from the relay connector. The movable portion of the cover is less likely to be displaced relative to the power supply board during the connection or the disconnection. Therefore, components mounted on the power supply board are less likely to damaged by the cover during the connection or the disconnection.

BRIEF DESCRIPTION OF THE DRAWINGS

FIG. 1 is an exploded perspective view of a television receiver according to the first embodiment of the present invention;

BEST MODE FOR CARRYING OUT THE INVENTION

First Embodiment

Figure 2:
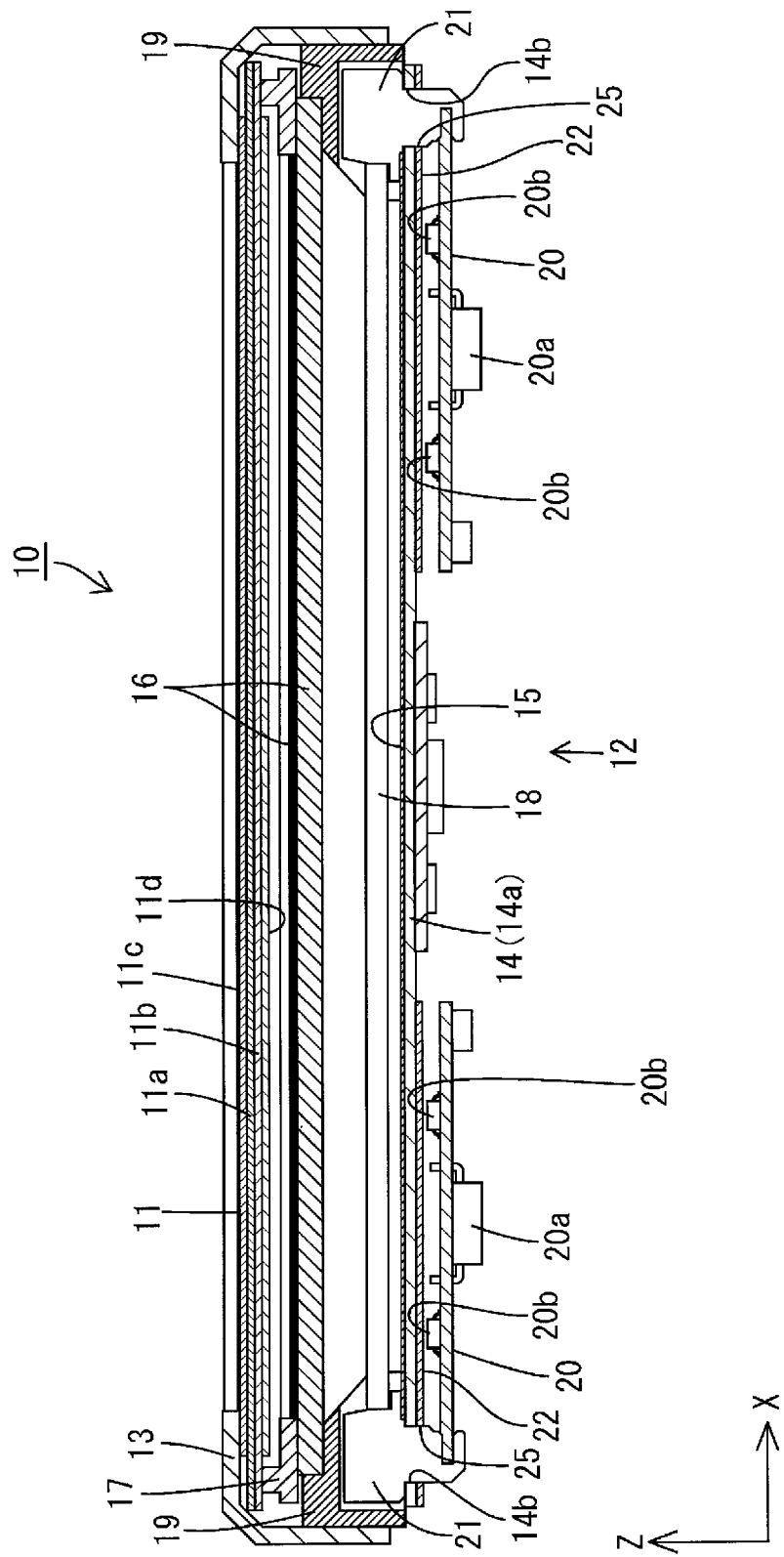
FIG. 2 is a cross-sectional view of a display device along a long-side direction.

The first embodiment of the present invention will be explained with reference to FIGS. 1 to 21. In this embodiment, a liquid crystal display device 10 will be explained. X-axes, Y-axes and Z-axes are present in some drawings to indicate orientations of the liquid crystal display device 10. In FIG. 2, the upper side and the lower side correspond to the front side (the front-surface side, the light exit side) and the rear side (the rear-surface side, an opposite side from the light exit side), respectively.

As illustrated in FIG. 1, the television receiver TV includes the liquid crystal display device 10 (a display device), a front cabinet Ca, a rear cabinet Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 has a landscape rectangular overall shape. As illustrated in FIG. 2, the liquid crystal display device 10 includes a liquid crystal panel 11, which is a display panel 11, and a backlight unit 12 (a lighting device), which is an external light source. The liquid crystal panel 11 and the backlight unit 12 are held together by a frame-shaped bezel 13.

Next, the liquid crystal panel 11 and the backlight unit 12 included in the liquid crystal display device 10 will be explained. The display panel 11 has a rectangular plan-view shape. As illustrated in FIG. 2, it includes a pair of glass substrates 11a and 11b bonded together with a predetermined gap therebetween and a liquid crystal layer (not shown) sealed between the glass substrates 11a and 11b. On the glass substrate 11a, switching components (e.g., TFTs), pixel electrodes and an alignment film are arranged. The switching components are connected to source lines and gate lines that are perpendicular to each other. The pixel electrodes are connected to the switching components. On the other glass substrate 11b, color filter having color sections of red (R), green (G) and blue (B) arranged in a matrix, counter electrodes and an alignment film are arranged. Image data and various kinds of control signals for displaying images are feed from a drive circuit board, which is not shown, to the source lines, the gate lines and the counter electrode. Polarizing plates 11c and 11d are arranged on outer surfaces of the glass substrates 11a and 11b, respectively.

As illustrated in FIG. 2, the backlight unit 12 is a so-called direct backlight including light sources that are arranged directly behind the liquid crystal panel 11. The backlight unit 12 includes a chassis 14, a reflection sheet 15, an optical member 16, a frame 17, a plurality of cold cathode tubes 18 (light sources), and holders 19. The chassis 14 has a box-like overall shape and an opening on the front side (the light exit side, the liquid crystal panel 11 side). The reflection sheet 15 is placed inside the chassis 14. The optical member 16 includes a plurality of pieces. It is arranged so as to cover the opening. The frame 17 holds the optical member 16. The cold cathode tubes 18 are arranged parallel to each other and housed in the chassis 14. The holders 19 cover the respective ends of the cold cathode tubes 18 so as to block light. Each holder 19 has light reflectivity. The backlight unit 12 further includes inverter boards 20 (power supply boards), relay connectors 21, and covers 22. The inverter bards 20 are arranged on the rear of the chassis 14. The relay connectors 21 are provided for relaying power supply from the inverter boards 20 to the cold cathode tubes 18. The covers 22 are arranged between the chassis 14 and the inverter boards 20.

The chassis 14 is made of metal, for instance, aluminum. The chassis 14 includes a bottom plate 14a having a rectangular plan-view shape similar to the liquid crystal panel 11. The long-side direction and the short-side direction of the bottom plate 14a match the X-axis direction and the Y-axis direction indicated in the drawings, respectively. The bottom plate 14a has connector insertion holes 14b in end areas of the long dimension thereof. The connector insertion holes 14b are through holes through which the relay connectors 21 are passed. A plurality of them (the number required for the cold cathode tubes 18 and the relay connectors 21) are arranged along the Y-axis direction (the short sides of the bottom plate 14a) so as to be parallel to each other. The reflection sheet 15 is made of white synthetic resin having high light reflectivity. It is placed over the inner surface of the chassis 14 so as to cover substantially an entire area and configured to reflect rays of light from the cold cathode tubes 18 toward the optical members 16 (the light exit side). The reflection sheet 15 has holes continue into the connector insertion holes 14b.

Each optical member 16 has a rectangular shape similar to the bottom plate 14a of the chassis 14 or the liquid crystal panel 11. The optical members 16 are made of synthetic resin capable of light transmission and arranged between the cold cathode tubes 18 on the rear-surface side and the liquid crystal panel 11 on the front-surface side. The optical members 16 include a diffuser plate, a diffuser sheet, a lens sheet and a brightness enhancement sheet arranged in this order from the rear side. They are configured to convert light emitted from each cold cathode tube, which is a linear light source, into planar light.

The frame 17 is formed in a frame shape along the outer edges of the liquid crystal panel 11 and the optical members 16. The frame 17 is arranged in front of the optical members 16. The outer edges of the optical members 16 are sandwiched between the frame 17 and the holders 19. The frame 17 supports the liquid crystal panel 11 from the rear side. The liquid crystal panel 11 is sandwiched between the frame 17 and the bezel 13 that is arranged in front of the liquid crystal panel 11.

Figure 3:
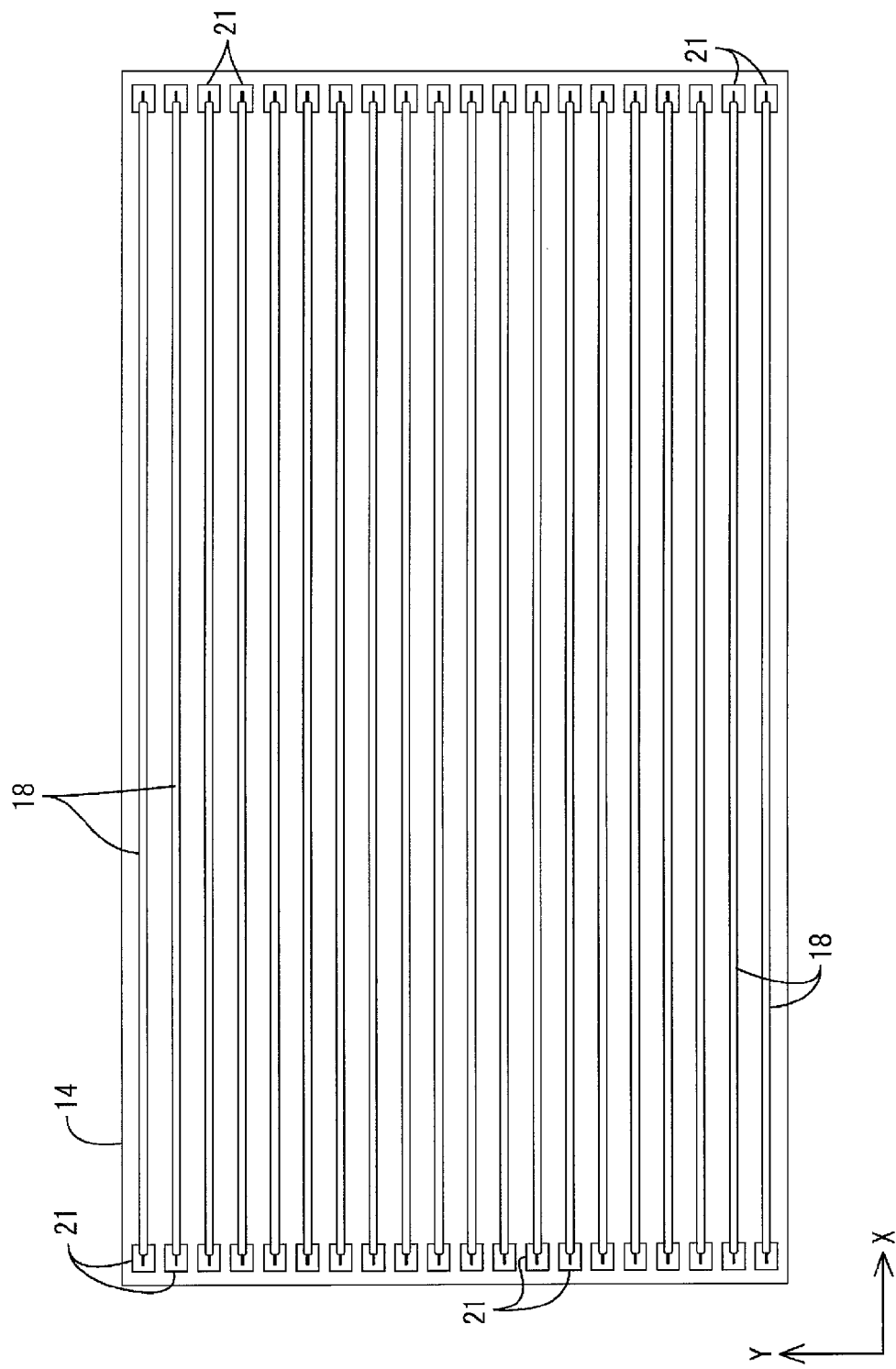
FIG. 3 is a plan view of a chassis with cold cathode tubes housed therein.

The cold cathode tubes 18 are one kind of linear light sources (tubular light sources). As illustrated in FIG. 3, the cold cathode tubes 18 are mounted inside the chassis 14 with the axial direction thereof aligned with the long-side direction of the chassis (the X-axis direction). They are arranged such that the axes thereof are substantially parallel to each other and a predetermined distance away from each other in the short side direction of the chassis 14 (the Y-axis direction).

The cold cathode tubes 18 are one kind of discharge tubes. Each of them includes an elongated glass tube 18a, a pair of electrodes (not shown), and a pair of outer leads 18b. The glass tube 18a has a circular cross section and closed ends. The electrodes are enclosed in the glass tube 18a and located at the respective ends of the glass tube 18a. The outer leads 18b project from the respective ends of the glass tube 18a to the outside. Mercury that is a luminescent material is sealed in the glass tube 18a and a fluorescent material is applied to the inner walls of the glass tube 18a (neither the luminescent material nor the fluorescent material are shown). Each outer lead 18b is made of metal having electrical conductivity and formed in an elongated round post-like shape. It projects outward (in an opposite direction to the electrode) from the end of the glass tube 18a and extends along the axial direction (the X-axis direction). The internal end of the outer lead 18b is connected to the electrode inside the glass tube 18a and thus the outer lead 18b and the electrode are at the same potential.

Each holder 19 is made of white synthetic resin having high light reflectivity. As illustrated in FIG. 2, it extends along the short side of the chassis 14 and has a box-like shape with an opening on the rear side. The holders 19 are attached to the respective ends of the long side of the chassis 14 so as to collectively cover the respective ends of the cold cathode tubes 18 (non-light-emitting portions) arranged at the ends in a parallel layout.

Each inverter board 20 includes a base plate made of synthetic resin (e.g., a paper phenol or a glass epoxy resin) on which wiring patterns are formed and various electronic components are mounted. Specifically, lead components 20a including power transformers and capacitors are mounted on the rear surface (the surface away from the chassis 14). On the front surface (the surface close to the chassis 14), wiring patterns (not shown) are formed and chip components 20b including resistors, diodes and capacitors are mounted. Lead of the lead components 20a are passed through the inverter board 20 so as to project from the front surface via the through holes and soldered to the wiring patterns. The chip components 20b are surface-mounted on the wiring patterns on the front surface of the inverter board 20. The inverter board 20 is connected to the power source P of the liquid crystal display device 10. It is configured to step up an input voltage from the power source P and to output a voltage higher than the input voltage. The output voltage is applied to each cold cathode tube 18. The inverter board 20 controls on-and-off of the cold cathode tubes 18. In FIGS. 7 to 21, the lead components 20a and the chip components 20b are not shown.

Figure 4:
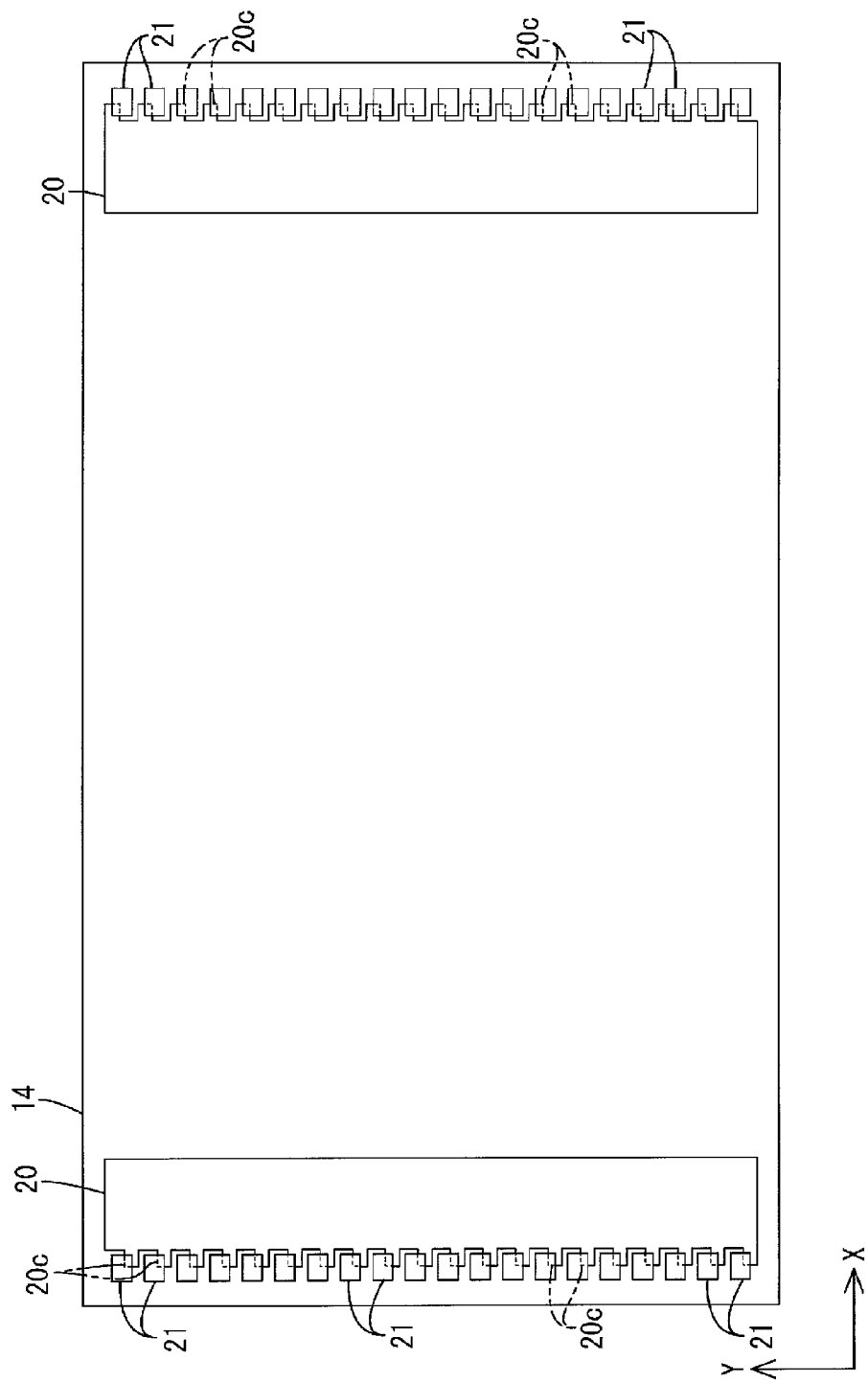
FIG. 4 is a bottom view of the chassis with inverter boards mounted thereto.

As illustrated in FIG. 4, the inverter boards 20 are mounted on the rear surface of the bottom plate 14a of the chassis 14 (the surface away from the cold cathode tubes 18). The inverter boards 20 are arranged at the respective ends of the long dimension of the bottom plate 14a so as to be symmetric. Each inverter board 20 has a rectangular plan-view shape. The inverter board 20 is placed with the board surface thereof substantially parallel to the board surface of the bottom plate 14a of the chassis 14 (the surface on the X-Y plane and perpendicular to the Z-axis that corresponds to the thickness direction of the liquid crystal display device 10) and with the long-side direction thereof aligned with the short-side direction of the bottom plate 14a (the Y-axis direction, a direction perpendicular to the axial direction of the cold cathode tube 18). The inverter boards 20 are fixed to the bottom plate 14 with screws.

Figure 12:
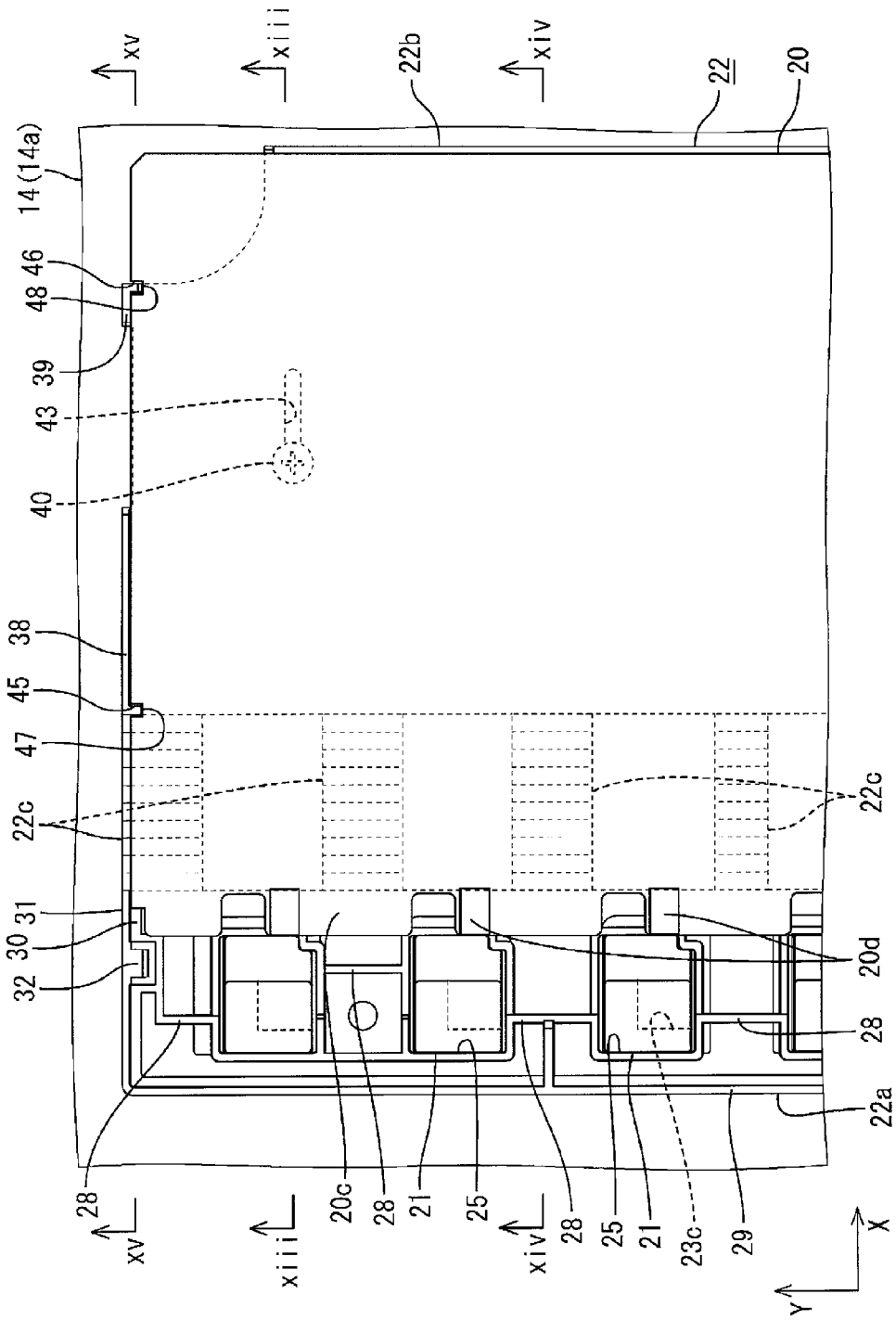
FIG. 12 is a magnified patial bottom view with the inverter board at a non-connected position.

Each inverter board 20 has connector connecting portions 20c at a front end with respect to the connecting direction of the inverter board 20 to the relay connector 21. The connector connecting portions 20c are inserted in the relay connectors 21 and connected thereto. A plurality of the connector connecting portions 20c are provided along the long side of the inverter board 20 (one for each relay connector 21) by cutting out parts of the front end portion of the inverter board 20. Namely, the front end portion of the inverter board 20 is formed in a comb-like shape. As illustrated in FIG. 12, each connector connecting portion 20c is inserted in the corresponding relay connector 21. Terminals 20d extending from the wiring pattern are provided at distal ends of the respective connector connecting portion 20c. A width of each connector connecting portion 20c is larger than that of an opening of a board holding hole 23c of each relay connector 21, which will be explained later. A difference between them is substantially equal to a distance between the adjacent relay connectors 21.

The inverter board 20 and the bottom plate 14a of the chassis 14 are arranged so as to face each other with a predetermined gap therebetween. The inverter board 20 is connected to or disconnected from the relay connectors 21 along the board surface thereof. Specifically, the inverter board 20 can be moved between a non-connected position and a connected position in the X-axis direction (a short-side direction of the inverter board 20). The connector connecting portions 20c are removed from the relay connectors 21 when the inverter board 20 is at the non-connected position (a start-of-insertion position, a removed position) as illustrated in FIGS. 12 to 15. The connector connecting portions 20c are inserted in the relay connectors 21 when the inverter board 20 is at the connected position (an inserted position, a start-of-removal position) as illustrated in FIGS. 16 to 21. A relative position of the inverter board 20 to the bottom plate 14 with respect to the Z-axis direction at the non-connected position is substantially equal to that of the inverter board 20 at the connected position.

Specifically, as illustrated in FIGS. 12 to 15, the connector connecting portions 20c are positioned a predetermined distance from the relay connectors 21 in the X-axis direction and not in contact with terminals 24 of the relay connectors 21 at the non-connected position. As illustrated in FIGS. 16 to 21, the connector connecting portions 20c are inserted in the relay connectors 21 and the terminals 20d are in contact with the terminals 24 of the relay connectors 21 at the connected position. The inverter board 20 can be moved between the non-connected position and the connected position in a substantially horizontal direction along the X-axis direction. A direction from the non-connected position to the connected position is referred to as a connecting direction, and a direction from the connected position to the non-connected position is referred to as a disconnecting direction (a pull-out direction). A direction toward the right in the X-axis direction in FIGS. 7-9, 13-15, and 17-19 corresponds to the connecting direction, and a direction toward the left in the X-axis direction in those drawings corresponds to the disconnecting direction. In the following descriptions about the connecting direction and the disconnecting direction of each inverter board 20 to or from the relay connectors 21, the left inverter board 20 and the left relay connectors 21 in FIG. 4 are referred. In descriptions before or after the descriptions, the right side and the left side in the X-axis direction in FIGS. 7-9, 13-15, and 17-19 are referred to as the front and the rear, respectively.

Figure 7:
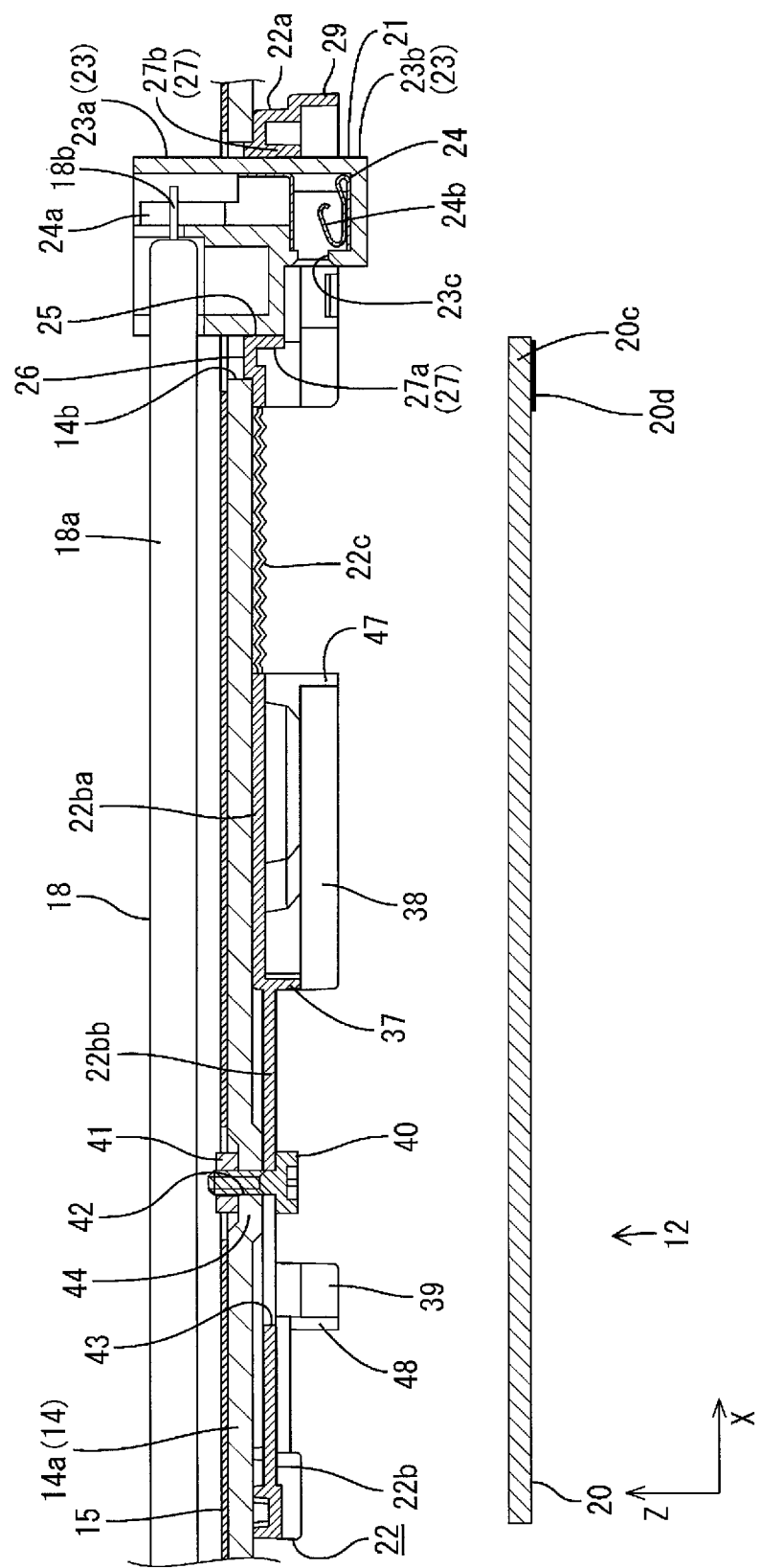
FIG. 7 is a cross-sectional view along line vii-vii in FIG. 6 with the inverter board at a removal position.
Figure 10:
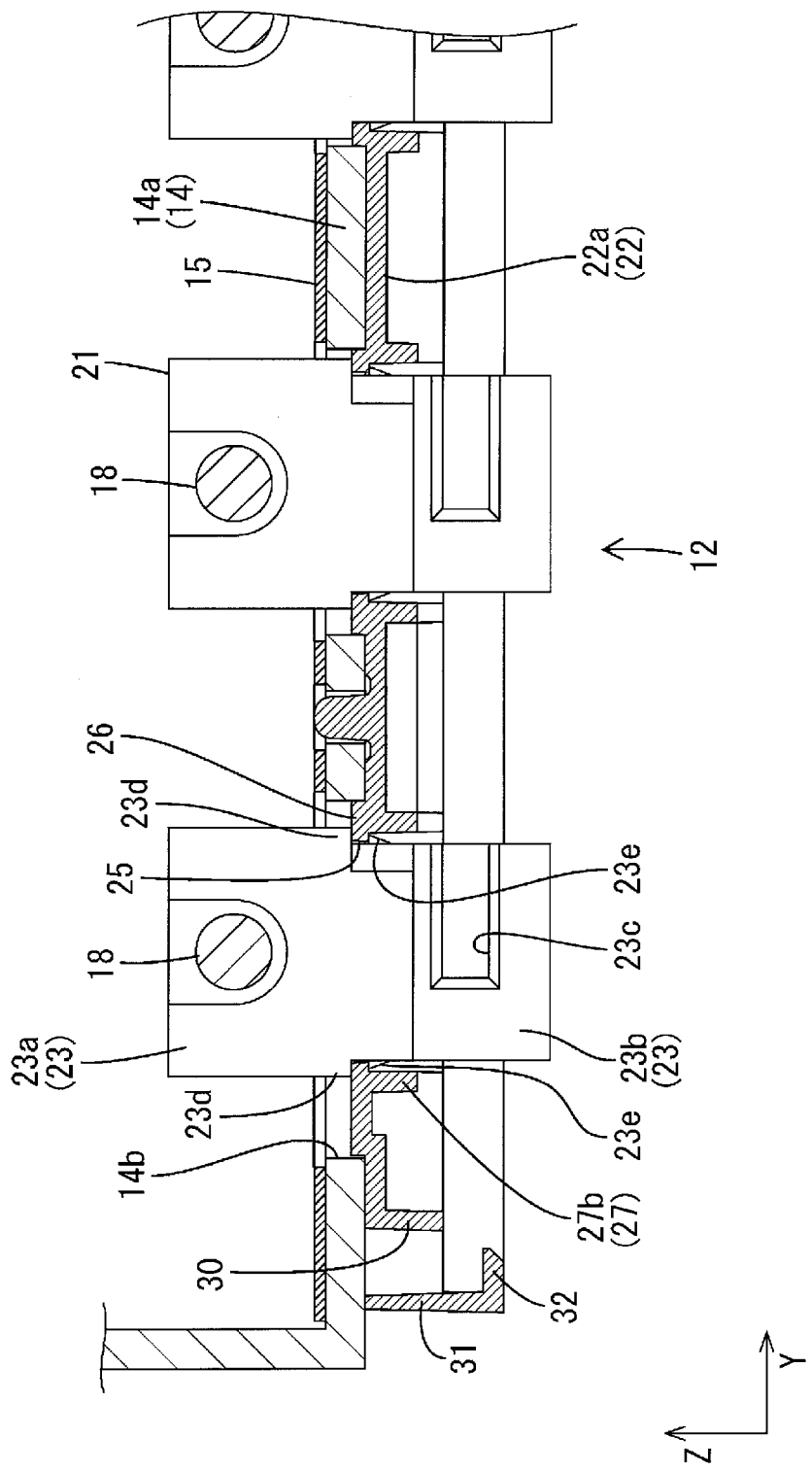
FIG. 10 is a cross-sectional view along line x-x in FIG. 6.

Next, the relay connectors 21 will be explained. As illustrated in FIG. 7, each relay connector 21 includes a housing 23 and the terminal 24. The housing 23 is made of synthetic resin having insulation properties and an overall shape thereof is a block-like shape. The terminal 24 is housed in the housing 23. Each relay connector 21 is passed through the bottom plate 14a of the chassis 14 and a cover 22, which will be explained later, and mounted. A part of the housing 23 inside the chassis 14 is a light source holding portion 23a that holds the end of the cold cathode tube 18. A part of the housing 23 outside the chassis 14 is a board holding portion 23b that holds the connector connecting portion 20c of the inverter board 20. The light source holding portion 23a has a round groove corresponding to a shape of the end of the cold cathode tube 18 (see FIG. 10). The board holding portion 23b has the board holding hole 23c that extends along the X-axis direction and the Y-axis direction. The board holding hole 23c opens to the rear (toward the inverter board 20) and to the right in FIG. 10. As illustrated in FIG. 10, the housing 23 is directly held by the cover 22 mounted to the chassis 14. Specifically, the light source holding portion 23a has a larger Y-axis dimension than that of the board holding portion 23b, and a wide portion 23d is held against the cover 22 from the front. The board holding portion 23b includes stoppers 23e that are held against the cover 22 from the rear.

As illustrated in FIG. 7, ends of the terminals 24 in the light source holding portions 23a are light source contact portions 24a that are in contact with the outer leads 18b of the cold cathode tubes 18. Ends of the terminals 24 in the board holding portions 23b are board contact portions 24b that are in contact with the terminals 20d of the connector connecting portions 20c. Each light source contact portion 24a and each board contact portion 24b have resilience and thus are elastically in contact with the outer lead 18b and the terminal 20d, respectively. An output voltage of the inverter board 20 is applied to the outer leads 18b and the electrodes of the cold cathode tubes 18 via the relay connectors 21.

As illustrated in FIG. 4, the relay connectors 21 are arranged in parts of the chassis 14 corresponding to the ends of the cold cathode tubes 18. Namely, they are arranged ends of the long dimension of the bottom plate 14a in pairs. Moreover, a plurality of them (corresponding to the number of the cold cathode tubes 18) are arranged along the short sides of the bottom plate 14a (along the Y-axis direction, an arrangement direction in which the cold cathode tubes 18 are arranged parallel to each other). Arrangement intervals of the relay connectors 21 are substantially equal to arrangement intervals of the cold cathode tubes 18. The Y-axis positions of the relay connectors 21 are substantially aligned with those of the cold cathode tubes 18.

Figure 5:
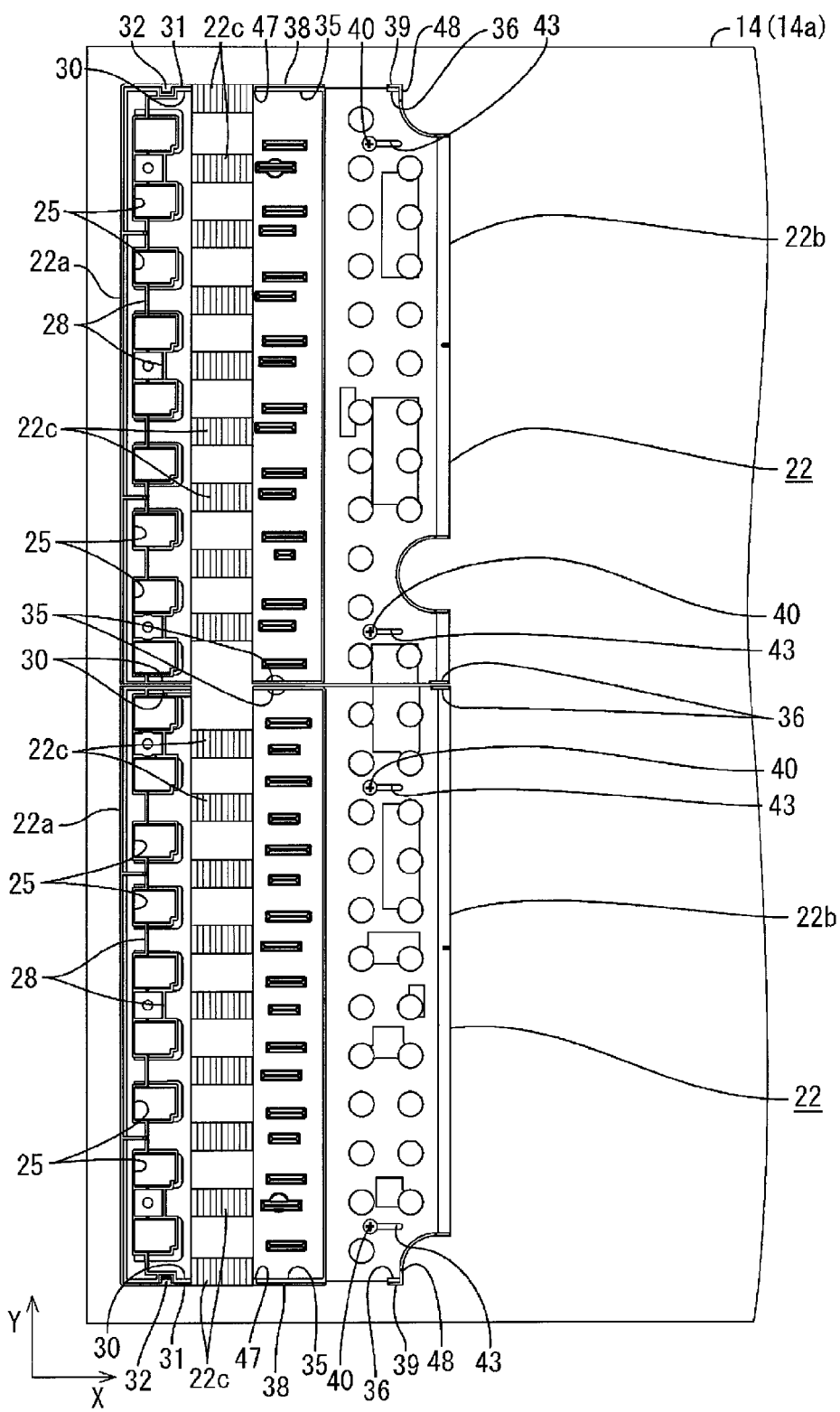
FIG. 5 is a magnified bottom view of the chassis with a cover mounted thereto.

Next, the covers 22 will be explained. Each cover 22 is made of synthetic resin having insulation properties. As illustrated in FIG. 2, the cover 22 is placed between the bottom plate 14a of the chassis 14 and the inverter board 20 (i.e., sandwiched therebetween). It protects the wiring patterns and the chip components 20b on the inverter board 20 from directly touching the bottom plate 14a. The covers 22 are mounted to the rear surface of the bottom plate 14a of the chassis 14 (the surface away from the cold cathode tubes 18) at the ends of the long dimension of the bottom plate 14a in pairs. They cover the areas of the bottom plate 14a in which the relay connectors 21 are arranged. As illustrated in FIG. 5, each cover 22 has a rectangular plan-view shape. The covers 22 are arranged along the Y-axis direction and parallel to each other. The long-side direction thereof is aligned with the short-side direction of the bottom plate 14a. The covers 22 are fixed to the respective ends of the long dimension of the bottom plate 14a with screws. The long dimension of each cover 22 is about a half of the short dimension of the chassis 14 or the long dimension of the inverter board 20.

The covers 22 are arranged between the chassis 14 and the inverter board 20. As described above, the inverter board 20 is moved between the non-connected position and the connected position with the predetermined relative position thereof to the covers 22 with respect to the Z-axis direction is maintained. As a result, the inverter board 20 is connected to or disconnected from the relay connectors 21. On the surface of the inverter board 20 facing the chassis 14 or the cover 22, the chip components 20b are mounted. Moreover, the leads of the lead components 20a project from the surface. Therefore, when the inverter board 20 is connected to or disconnected from the relay connectors 21, the chip components 20b or the leads may touch parts of the covers 22. If the inverter board 20 continues to be moved relative to the covers 22 while the chip components 20b or the leads are touching the parts, the components may be damaged. If the inverter board 20 is damaged, stability in performance thereof may decrease or it may malfunction, that is, a yield rate decreases. Moreover, an additional work for replacing the defective inverter board 20 with a new one may be required. As a result, a manufacturing cost may increase and work efficiency may decrease.

Therefore, each cover 22 of this embodiment is configured such that a part thereof is movable relative to the chassis 14 with respect to the X-axis direction, that is, the connecting direction and the disconnecting direction of the inverter board 20. Specifically, as illustrated in FIG. 5, each cover 22 includes a fixed portion 22a, a movable portion 22b, and a flexible portions 22c. The fixed portion 22a is fixed to the chassis 14. The movable portion 22b is attached to the chassis 14 so as to be movable relative to the chassis 14 with respect to the X-axis direction. The flexible portions 22c are connected between the fixed portion 22a and the movable portion 22b. The flexible portions 22c can expand and contract in the X-axis direction. The fixed portion 22a, the movable portion 22b, and the flexible portions 22c are integrally provided. Namely, the cover 22 is constructed from the fixed portion 22a, the movable portion 22b, and the flexible portions 22c, which are integrally provided. The fixed portion 22a and the movable portion 22b are arranged away from each other in the front-rear direction, and the flexible portions 22c are arranged between the fixed portion 22a and the movable portion 22b. The movable portion 22b is moved closer to or away from the fixed portion 22a and the relay connectors 21 as the inverter board 20 is moved to be connected to or disconnected from the relay connectors 21. During the movement of the movable portion 22b, the flexible portions 22c expand or contract. The fixed portion 22a and the movable portion 22b have Y-axis dimensions substantially equal to an overall Y-axis dimension of the cover 22. The Y-axis dimension of each flexible portion 22c is smaller than the Y-axis dimension of the fixed portion 22a or the movable portion 22b.

Figure 6:
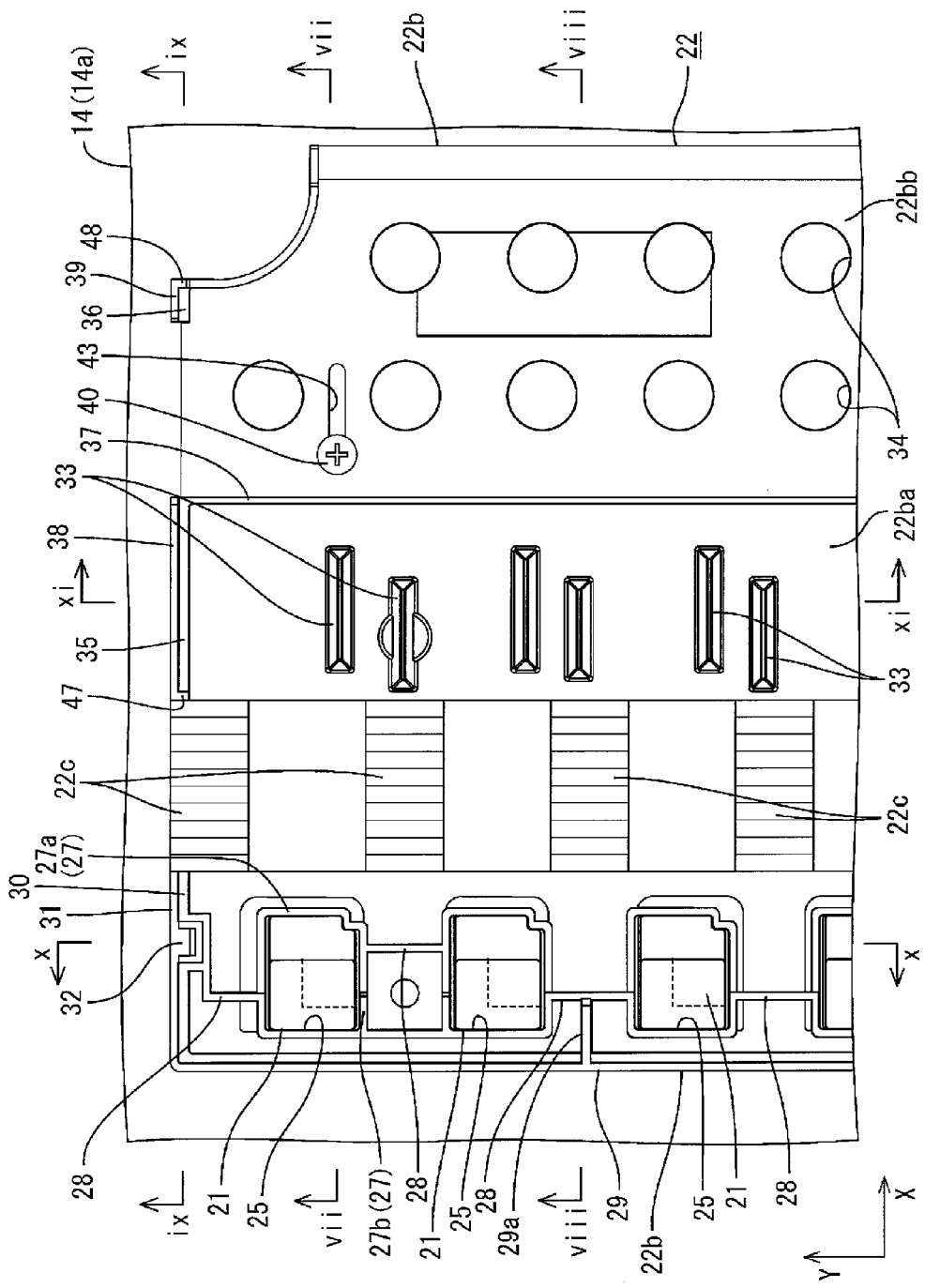
FIG. 6 is a magnified partial bottom view illustrating positioning structures of the cover.

The fixed portion 22a has a plate-like shape parallel to the board surfaces of bottom plate 14a of the chassis 14 and the inverter board 20. The fixed portion 22a is fixed to the bottom plate 14a of the chassis 14 with screws that are not illustrated in the drawings and thus a movement thereof is not allowed. As illustrated in FIG. 6, the fixed portion 22a is arranged closer to the relay connectors 21 than the movable portion 22b so as to overlap an area of the chassis 14 in which the relay connectors 21 are arranged when viewed in plan. The fixed portion 22a has connector holes 25 that are through holes in which the relay connectors are fitted. A plurality of the connector holes 25 are arranged in the fixed portion 22a along the Y-axis direction (along the board surface of the inverter board 20 and perpendicular to the connecting and the disconnecting direction) in a parallel layout. The connector holes 25 continue into the respective connector insertion holes 14b of the chassis 14.

As illustrated in FIGS. 7 and 10, each connector hole 25 has a plan-view size, that is, X-axis size and Y-axis size smaller than those of the connector insertion hole 14b. The plan-view size of each connector hole 25 is substantially equal to an overall size of the relay connector 21. When the relay connector 21 is passed through the connector insertion hole 14b and the connector hole 25 and mounted, edges of the connector hole 25 are sandwiched between the wide portions 23d of the light source holding portions 23a and the stoppers 23e. Namely, the relay connector 21 is directly fixed to the cover 22 and indirectly fixed to the chassis 14. Clearances in predetermined X-axis size and Y-axis size are provided between the relay connector 21 and edges of the connector insertion hole 14b of the bottom plate 14a of the chassis 14. A holding protrusion 26 is provided at the edges of each connector hole 25 of the cover 22. The holding protrusion 26 projects toward the front (toward the chassis 14) such that it is fitted in the connector insertion hole 14b. The holding protrusion 26 has a short tubular shape and closes the clearances (it is provided between the edges of the connector insertion hole 14b and the relay connector 21). The holding protrusion 26 separates the relay connector 21 from the edges of the connector insertion hole 14b to maintain proper isolation therebetween.

As illustrated in FIG. 6, ribs 27 project from edges of the connector holes 25 toward the rear-surface side (toward the inverter board 20) in the fixed portion 22a. As illustrated in FIG. 7, each rib 27 has a short tubular shape with different heights in the front portion and the rear portion. The rear portion is a low portion 27a, the height of which is relatively low. The front portion is a high portion 27b, the height of which is relatively high. The height of the high portion 27b is defined such that a distal end surface thereof reaches the front surface of the inverter board 20 (the surface opposite the cover 22).

Figure 8:
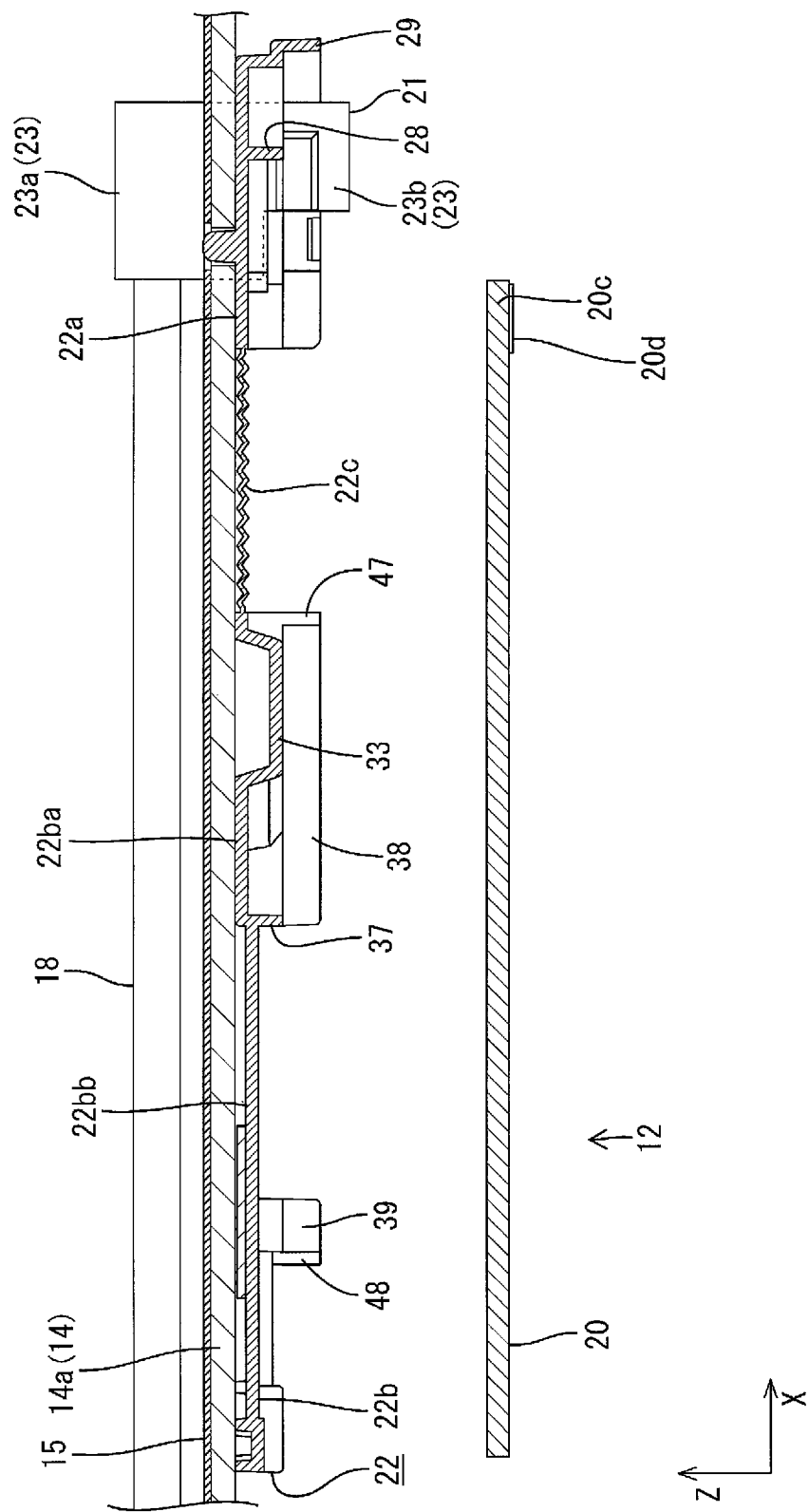
FIG. 8 is a cross-sectional view along line viii-viii in FIG. 6 with the inverter board at the removal position.

As illustrated in FIGS. 6 and 8, blocking portions 28 projects toward the rear-surface side. Each blocking portion 28 is arranged in an area between the adjacent connector holes 25. The blocking portions 28 are also arranged in areas between the connector holes 25 the closest to the respective ends with respect to the Y-axis direction and respective front vertical support walls 30, which will be explained later. Each blocking portion 28 extends along the Y-axis direction. Specifically, each blocking portion 28 arranged in the area between the connector holes 25 extends continuously for an entire length of the area. It is connected to the ribs 27 formed at the edges of the connector holes 25. Each blocking portion 28 arranged between the connector hole 25 the closest to the end and the front vertical support wall 30 extends continuously for an entire length of the area. It is connected to the rib 27 formed at the edge of the connector hole 25 the closest to the end and to the front vertical support wall 30. The blocking portion 28 has the height substantially equal to that of the high portion 27b of the rib 27. Therefore, the distal end surface of the front blocking portion 35a is in contact with the front surface of the connector connecting portion 20c of the inverter board 20 that is set at the connected position (see FIG. 18). Therefore, the front of the space (or a gap) between inverter board 20 that is at the connected position and the cover 22 is continuously blocked substantially without any openings. Therefore, foreign substances from the front can be properly blocked.

As illustrated in FIGS. 6 and 7, a front wall portion 29 projects from the front end portion of the front portion 22a of each cover 22 toward the rear-surface side and a distal end thereof is located higher than the high portion 27b of the rib 27. The front wall portion 29 extends along the Y-axis direction and a plurality of extending portions 29a that extend from a middle of the front wall portion 29 to the rear. The extending portions 29a are connected to the blocking portions 28 and in contact with the front end surface of the inverter board 20 at the connected position.

Figure 9:
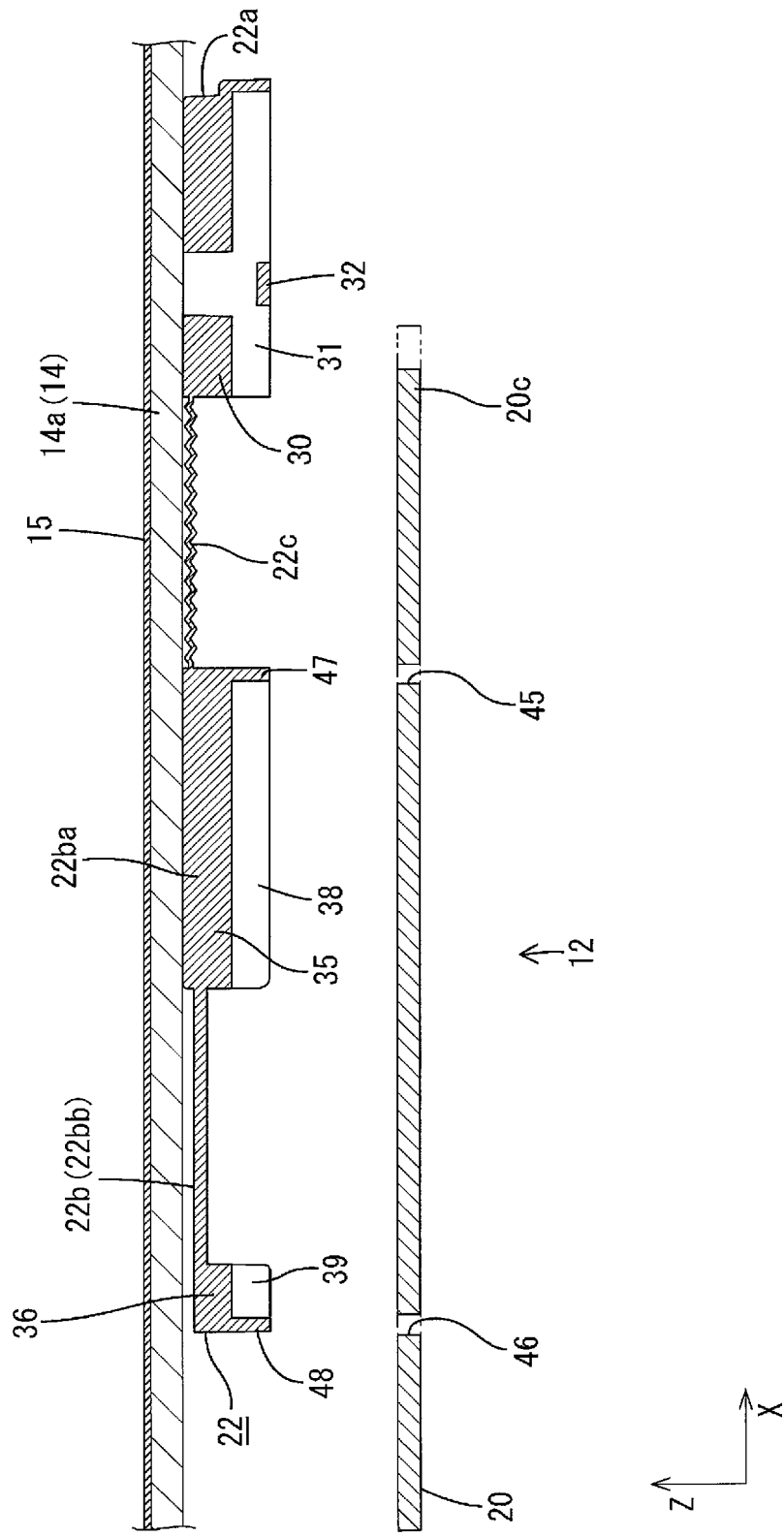
FIG. 9 is a cross-sectional view along line ix-ix in FIG. 6 with the inverter board at the removal position.

As illustrated in FIGS. 6 and 9, front vertical support walls 30 that support the inverter board 20 from the front-surface side are provided at the respective ends of the fixed portion 22a with respect to the long-side direction of the fixed portion 22a (the Y-axis direction). Each front vertical support wall 30 extends along the X-axis direction for about an entire X-axis dimension of the fixed portion 22a. The front vertical support walls 30 are provided on both covers 20. The front vertical support walls 30 support the ends of the inverter board 20 with respect to the long-side direction and the front end portion of the inverter board 20 around the middle with respect to the long-side direction from the front-surface side (see FIG. 19).

Figure 16:
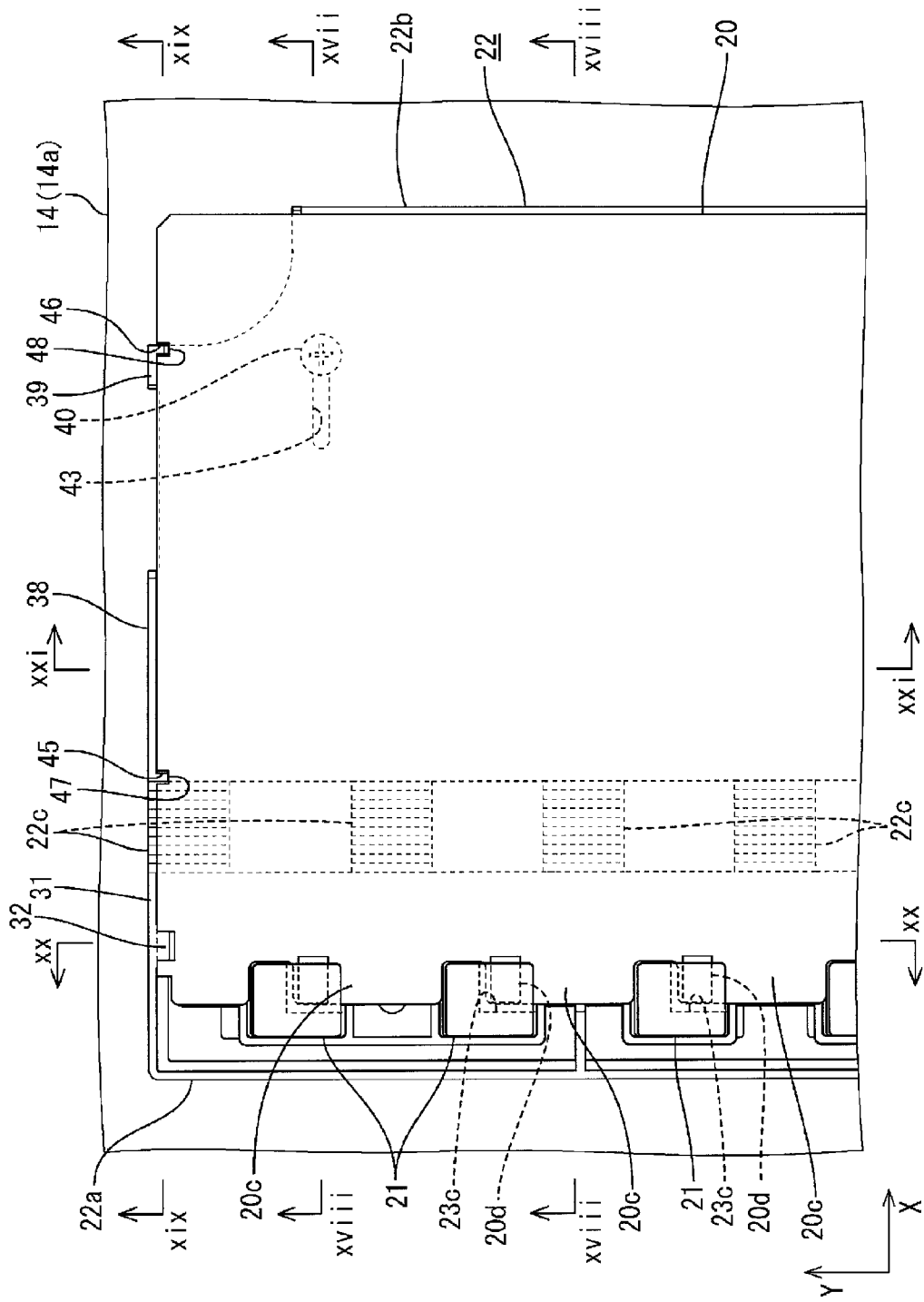
FIG. 16 is a magnified partial bottom view with the inverter board at the connected position.

Front positioning portions 31 are provided for positioning the front portion of the inverter board 20 with respect to the Y-axis direction. One of the front vertical support walls 30 in each fixed portion 22a is located in an area corresponding to the end of the chassis 14 with respect to the short-side direction of the chassis 14 when the cover 22 is mounted to the chassis 14. As illustrated in FIGS. 6 and 9, each front positioning portion 31 is located adjacent to the front vertical support wall 30 of each fixed portion 22a. Namely, the front positioning portions 31 are arranged at the respective ends of the front portion of the inverter board 20 with respect to the long-side direction. Each front positioning portion 31 is a vertical wall that projects from an outer edge of the front vertical support wall 30 toward the rear-surface side and extends along the X-axis direction similar to the front vertical support wall 30. The front positioning portion 31 has a thickness about a half of that of the front vertical support wall 30. The front end portion of the positioning portion 31 is connected to the front wall portion 29. As illustrated in FIGS. 12 and 16, the inner wall of the front positioning portion 31 is in contact with the side end surface of the inverter board 20 supported by the front vertical support wall 30. As illustrated in FIG. 5, a distance between the inner walls of the front positioning portions 31 arranged in areas corresponding to the respective ends of the chassis 14 with respect to the Y-axis direction so as to face each other is substantially equal to the long dimension of the inverter board 20. Each front positioning portion 31 is in contact with the corresponding side end surface of the front portion of the inverter board 20 whether the inverter board 20 is at the non-connected position or the connected position. The contact area is larger when the inverter board 20 is at the connected position than when the inverter board is at the non-connected position. With this configuration, the inverter board 20 is less likely to be displaced with respect to the Y-axis direction.

The fixed portions 22a include board stoppers 32 adjacent to the respective front positioning portion 31. The board stoppers 32 hold the inverter board 20 from the rear-surface side (from a side opposite from the chassis 14). As illustrated in FIGS. 6, 9 and 10, each board stopper 32 projects inward from the distal end of the front positioning portion 31 along the Y-axis direction (i.e., toward the middle of the short dimension of the chassis 14). The board stopper 32 is arranged more to the rear than the adjacent blocking portion 28 and in an area that overlaps the connector hole 25 in the X-axis direction. The inner surface of the board stopper 32 facing the chassis 14 is in contact with the rear surface of the inverter board 20. The board stopper 32 is not in contact with the inverter board 20 when the inverter board 20 is at the non-connected position (see FIG. 15). It is in contact with the inverter board 20 when the inverter board 20 is at the connected position (see FIG. 19). With this configuration, the inverter board 20 at the connected position is less likely to deform in a direction that crosses the board surface of the inverter board 20.

The fixed portion 22a faces the front end portion of the inverter board 20 connected to the relay connectors 21, and the movable portion 22b faces a large area of the inverter board 20 except for the front end portion (see FIG. 16). Many components (most of the components) are mounted in the large area of the inverter board 20 except for the font end portion. The movable portion 22b has a function for keeping those components from directly touching the chassis 14. As illustrated in FIG. 5, the movable portion 22b has a plate-like shape parallel to the board surfaces of the bottom plate 14a of the chassis 14 and the inverter board 20. The movable portion 22b is attached to the bottom plate 14a with attaching structures, which will be explained later, so as to be movable along the X-axis direction. The movable portion 22b is arranged around the middle of the long dimension of the chassis 14, that is, further away from the relay connectors 21 (more to the rear) than the fixed portion 22a. It is located in an area that does not overlap the arrangement area of the relay connectors 21 in plan view.

Figure 11:
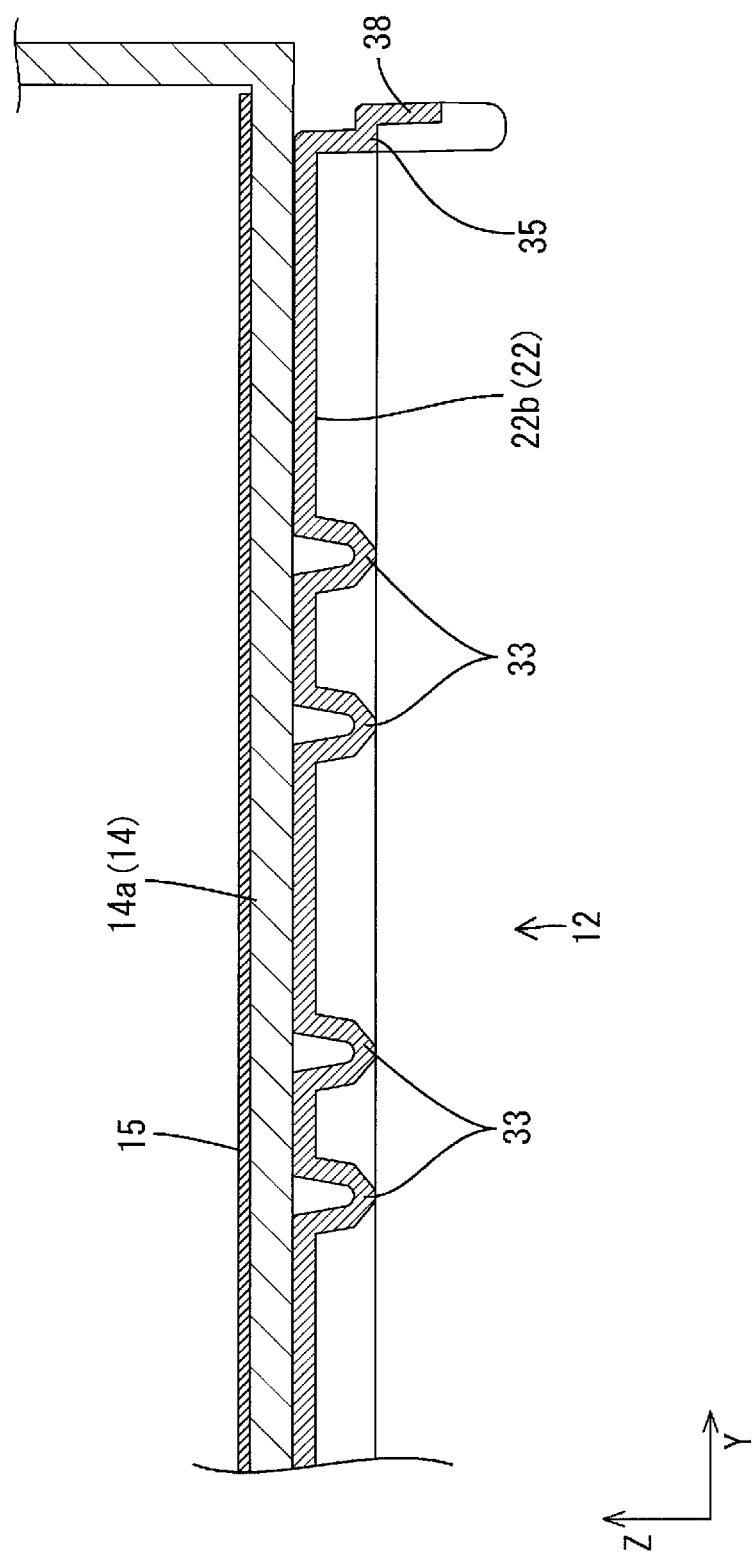
FIG. 11 is a cross-sectional view along line xi-xi in FIG. 6.

As illustrated in FIGS. 6 and 7, each movable portion 22b includes a front portion 22ba that is in contact with the bottom plate 14a and a rear portion 22bb that is a predetermined distance away from the bottom plate 14a. Support projections 33 are provided in a middle area of the front portion 22ba with respect to the Y-axis direction. The support projections 33 support the inverter board 20 from the rear-surface side so as to restrict a deformation of the inverter board 20 such as a warp. As illustrated in FIGS. 6 and 8, each support projection 33 extends along the X-axis direction (the connecting direction). A plurality of the support projections 33 are arranged along the Y-axis direction so as to be parallel to each other. For most of the connector holes 25, two support projections 30a are provided for each connector hole 25. Some of the support projections 33 are connected to the low portions 27a of the ribs 27. As illustrated in FIGS. 8 and 11, each support projection 33 is formed by projecting apart of the front portion 22ba to the front-surface side. The outer surfaces of the support projection 33 are tapered surfaces that are tapered at two different angles. The support projection 33 supports a part of the inverter board 20 immediately rear of the connector connecting portion 20c that is inserted in the relay connectors 21 (see FIG. 18). The rear portion 22bb has heat dissipation holes 34 that are through holes for dissipating heat and arranged in a matrix.

As illustrated in FIGS. 5, 6, and 9, the vertical support walls 35 and 36 are arranged at the ends of the front portion 22ba and the rear portion 22bb with respect to the Y-axis direction, respectively. The vertical support walls 35 and 36 support the inverter board 20 from the front-surface side. The vertical support walls 35 and 36 extend along the X-axis direction. The vertical support walls 35 and 36 support the end portion of the inverter board 20 and the central portion of the inverter board 20 with respect to the long-side direction (see FIG. 19). The center vertical support walls 35 are arranged around the middle of the inverter board 20 with respect to the X-axis direction. The rear vertical support walls 36 are arranged at the rear of the inverter board 20 with respect to the X-axis direction. The center vertical support walls 35 support the center portion of the inverter board 20, and the rear vertical support walls 36 support the rear portion of the inverter board 20. The center vertical support walls 35, the rear vertical support walls 36, and the front support walls 30 of the front portion 22ba support each end portion of the inverter board 20 with respect to the long-side direction at three points that are away from each other in the front-rear direction. Each front vertical support wall 35 extends for an entire length of the side end portion of the front portion 22ba. Each center vertical support wall 36 extends for a rear end part of the side end portion of the rear portion 22bb. A horizontal support wall 37 is provided in the rear end portion of the front portion 22ba so as to connect one of the center vertical support walls 35 to another. As illustrated in FIG. 5, the horizontal support wall 37 is arranged more to the rear than the support projections 33 so as to extend along the Y-axis direction. The horizontal support wall 37 supports the inverter board 20 from the rear-surface side at that position.

Some of the vertical support walls 35 and 36 in the rear portion 22bb are located in areas corresponding to ends of the chassis 14 with respect to the short-side direction of the chassis 14 when the covers 22 are mounted to the chassis 14. As illustrate in FIGS. 5, 6, and 9, two pairs of positioning portions 38 and 39 are provided at those vertical support walls 35 and 36, one pair at the front and the other pair at the rear. The positioning portions 38 and 39 position the rear portion of the inverter board 20 with respect to the Y-axis direction. Namely, two pairs of the positioning portions 38 and 39 are provided at the respective ends of the long dimension of the rear portion of the inverter board 20. The positioning portions connected to the respective center vertical support walls 35 are center positioning portions 38. The positioning portions connected to the respective rear vertical support walls 36 are rear positioning portions 39. The positioning portions 35 and 36 have vertical wall-like shapes. They project from the outer edges of the respective vertical support walls 35 and 36 toward the rear-surface side, and extend along the X-axis direction similar to the vertical support walls 35 and 36. Each positioning portion 38 or 39 has a thickness about a half of the thickness of the vertical wall 35 or 36. As illustrated in FIGS. 12 and 16, an inner wall surface of each positioning portion 38 or 39 is in contact with the side end surface of the inverter board 20 supported by the vertical support walls 35 and 36. As illustrated in FIG. 5, a distance between the inner wall surfaces of the positioning portions 38 or 39 arranged at the locations corresponding the ends for the chassis 14 with respect to the Y-axis direction and facing each other is substantially equal to the long dimension of the inverter board 20. The positioning portions 38 and 39 are in contact with the side end surfaces of the end portion of the inverter board 20 whether the inverter board 20 is at the non-connected position or the connected position. The contact area measured when the inverter board 20 is at the connected position is substantially equal to the contact area measured when the inverter board 20 is at the non-connected position. With the center positioning portions 38, the rear positioning portions 39, and the front positioning portions 31 in the front portions 22ba, a displacement of the inverter board 20 with respect to the Y-axis direction is restricted at three positions away from each other in the front-rear direction.

Next, the attaching structures with which the movable portions 22b are attached to the chassis 14 will be explained in detail. As illustrated in FIGS. 6 and 7, the attaching structures include bolts 40, nuts 41, bolt holes 42 and 43, and receiving portions 44. The bolts 40 and the nuts 41 are used for attaching the movable portions 22b to the bottom plate 14a. The bolt holes 42 and 43 are formed in the movable portions 22b and the bottom plate 14a for passing the bolts 40. The receiving portions 44 are formed in the bottom plate 14a for receiving the movable portions 22b. The attaching structures are provided at four positions in the bottom plate 14a away from each other in the short-side direction of the bottom plate 14a (the Y-axis direction). Two attaching structures are provided near the respective ends of each cover 22 (see FIG. 5). Each receiving portion 44 of the attaching structures is formed by projecting a part of the bottom plate 14a toward the rear-surface side by a distance between the movable portion 22b and the bottom plate 14a. The rear surface of the receiving portion 44 receives the movable portion 22b. Each receiving portion 44 has a bolt hole 42 that is a round through hole through which the bolt 40 is passed. The bolt hole 42 is formed at the center of the receiving portion 44. A diameter of the bolt hole 42 is substantially equal to or larger than a diameter of a shaft of the bolt 40. The nuts 41 that are threaded onto the respective bolts 40 are placed in the respective receiving portions 44 on the front-surface side.

As illustrated in FIGS. 6 and 7, each bolt hole 43 of the movable portion 22b is an elongate hole that extends along the X-axis direction, that is, the moving direction of the movable portion 22b or the connecting direction and the disconnecting direction of the inverter board 20. Specifically, the minor axis of the elongated bolt hole 43 is substantially equal to the diameter of the bolt hole 42 and the major axis thereof is sufficiently larger than the diameter of the bolt hole 42. When the bolt 40 is passed through the bolt hole 43, a predetermined clearance is provided between the bolt 40 and an edge of the bolt hole 43 with respect to the X-axis direction. Therefore, the edge of the bolt hole 43 can move relative to the bolt 40 with respect to the X-axis direction within a range corresponding to the clearance. The movable portion 22b moves relative to the chassis 14 with respect to the X-axis direction. Specifically, the movable portion 33b can move between a backward position and a forward position in the front-rear direction along the X-axis direction. At the backward position, the bolt 40 is in contact with the front edge of the bolt hole 43 (see FIGS. 6, 7, 12, and 13). At the forward position, the bolt 40 is in contact with the rear edge of the bolt hole 43 (see FIGS. 16 and 17). The size of the major axis of the bolt hole 43 is substantially equal to a moving distance (or a travel distance) of the inverter board 20 from the non-connected position to the connected position. Namely, the moving distance of the movable portion 22b is substantially equal to the moving distance of the inverter board 20. Therefore, the movable portion 22b always follows the movement of the inverter board 20.

Next, the flexible portions 22c connected between the fixed portion 22a and the movable portion 22b will be explained. As illustrated in FIG. 5, each flexible portion 22c is connected to the rear end portion of the fixed portion 22a and the front end portion of the movable portion 22b. A plurality of the flexible portions 22c (the same number as the relay connectors 21) are arranged along the Y-axis direction so as to be parallel to and separately from each other. Specifically, each flexible portion 22c is arranged at a location off the corresponding relay connector 21 with respect to the Y-axis direction (i.e., arranged in an offset location). Namely, the flexible portions 22c are arranged in areas that do not overlap the respective terminals 20d in plan view. The terminals 20s are contacts of the inverter board 20 with the relay connectors 21. As illustrated in FIGS. 8 and 9, each flexible portion 22c has alternate peaks and valleys along the X-axis direction and connected to one another. The flexible portion 22c has an accordion-like overall shape in a cross section. The flexible portion 22c elastically expands or contract in the X-axis direction. Therefore, the relative movement of the movable portion 22b to the fixed portion 22a along the X-axis direction, that is, the connecting direction and the disconnecting direction of the inverter board 20 is allowed. The maximum length of the flexible portion 22c is larger than the moving distance of the inverter board 20 or the movable portion 22b. Namely, the bolt 40 is in contact with the edge of the bolt hole 43 when the flexible portion is at the maximum length or immediately before a start of contraction. As a result, a further movement of the movable portion 22b is restricted. Therefore, an excessive movement of the movable portion 22b farther than the maximum length of the movable portion 22b does not occur.

Furthermore, this embodiment includes follow-up mechanisms for moving the movable portions 22b according to the movement of the inverter board 20 for a connection or a disconnection. The follow-up mechanisms are provided in the inverter board 20 and the movable portions 22b. As illustrated FIGS. 5, 6, and 9, the follow-up mechanisms include pressing portions 45 and 46, and pressed portions 47 and 48. The pressing portions 45 and 46 are provided in the inverter board 20. The pressed portions 47 and 48 are provided in the movable portions 22b and pressed by the pressing portions 45 and 46 during the movement of the inverter board 20 for a connection or a disconnection. The pressed portions 47 and 48 are fitted in the respective pressing portions 45 and 46. The pressed portions 47 and 48 are arranged in areas of the movable portions 22b overlapping the inverter board 20 in plan view. The pressed portions 47 and 48 are protrusions that project from each movable portion 22b toward the inverter board 20. The pressing portions 45 and 46 are formed by cutting out parts of the inverter board 20 overlapping the presses portions 47 and 48. The pressing portions 45 and 46 are recesses that receive the respective pressed portions 47 and 48.

Specifically, a pair of the pressed portions 47 and 48 is arranged in an area of each movable portion 22b corresponding to the corresponding end of the chassis 14 with respect to the short-side direction. The pressed portions 47 and 48 are away from each other in the front-rear direction. The pressed portions 47 and 48 are connected to the respective vertical support walls 35 and 36, and the respective positioning portions 38 and 39 in the area corresponding to the corresponding end of the chassis 14 with respect to the short-side direction (the long-side direction of the inverter board 20). Specifically, the front pressed portion 47 is connected to the front end of the center vertical support wall 35 and the front end of the center positioning portion 38. The rear pressed portion 48 is connected to the rear end of the rear vertical support wall 36 and the rear end of the rear positioning portions 39. Each pressed portion 47 or 48 has a rectangular plan-view shape and projects from the edge of the corresponding vertical wall 35 or 36 toward the center of the chassis 14 with respect to the short-side direction. The height of each pressed portion 47 or 48 is about a half of the thickness of the vertical support wall 35 or 36. Therefore, the distal end surface of the pressed portions 47 or 48 is substantially on the same plane as the inner wall surface of the vertical support wall 35 or 36.

Each pressing portion 45 or 46 is formed by cutting out a part of the end portion of the inverter board 20 with respect to the long-side direction. A pair of the pressing portions 45 and 46 is arranged at each end portion. The pressing portions 45 and 46 in a pair are away from each other in the front-rear direction. Parts of the edge of the inverter board 20 is cut out so as to form the pressing portions 45 and 46 that open outward to the side. The plan-view shapes of the pressing portions 45 and 46 are rectangular. The X-axis dimension and the Y-axis dimension of each pressing portion 45 or 46 are substantially equal to or slightly larger than those of the pressed portion 47 or 48. Therefore, the pressed portions 47 and 48 are fitted in the respective pressing portions 45 and 46. In that condition, the front end surfaces and the rear end surfaces of the pressed portions 47 and 48 are in contact with the front walls and the rear walls of the pressing portions 45 and 46, respectively. Namely, whether the inverter board 20 is at the non-connected position or the connected position, the front end surfaces and the rear end surfaces of the pressed portions 47 and 48 are in contact with the front walls and the rear walls of the pressing portion 45 and 46, respectively. During the movement of the inverter board 20 between the non-connected position and the connected position, the pressed portions 47 and 48 are pressed against the front walls or the rear walls of the respective pressing portions 45 and 46 according to the movement of the inverter board 20. Moreover, each movable portion 22b moves between the backward position and the forward position according to the movement of the inverter board 20. Furthermore, during the setting of the inverter board 20 removed from the covers 22 to the non-connected position, the pressed portions 47 and 48 on the movable portions 22b at the backward position are fitted in the pressing portions 45 and 46. As a result, the inverter board 20 is set to the non-connected position with respect to the X-axis direction. Namely, the pressing portions 45 and 46, and the pressed portions 47 and 48 also function as the positioning structures for positioning the inverter board 20 to the non-connected position with respect to the X-axis direction.

This embodiment has the above configuration. Next, functions of this embodiment will be explained. The liquid crystal panel 11 and the backlight unit 12 prepared separately are fixed together by the bezel 13, and the liquid crystal display device having the above configuration is prepared. Assembly of the backlight unit 12 will be explained.

In the assembly of the backlight unit 12, the reflection sheet 15 is placed over the front inner surface of the chassis 14 and the covers 22 are attached to the rear outer surface of the chassis 14. During the attachment of each cover 22, the movable portion 22b is arranged at the backward position where the bolts 40 are in contact with the front edges of the respective bolt holes 43 as illustrated in FIGS. 6 to 9. Under this condition, the flexible portions 22c are in the free states and thus with little elastic forces. The relay connectors 21 are mounted to the chassis 14 from the inner side of the chassis 14 and fitted in the respective connector holes 25 of the covers 22. As a result, the relay connectors 21 are held to the fixed portions 22a of the covers 22. Then, the cold cathode tubes 18 are placed in the chassis 14. The outer leads 18b at the ends of the cold cathode tubes 18 are inserted in the light source holding portions 23a of the relay connectors 21 so as to elastically in contact with the light source contacts 24a of the terminals 24. The holders 19, the optical members 16, and the frame 17 are mounted to the chassis 14 from the front (see FIG. 2).

On the rear surface of the chassis 14, the inverter boards 20 are mounted to the chassis 14 and the covers 22. Each inverter board 20 is moved close to the chassis 14 and the covers 22 from the removal position illustrated in FIGS. 7 to 9 with the surface on which the wiring patterns and the chip components 20b are provided on the front side. The inverter board 20 is moved from the rear side toward the chassis 14 and the covers 22 along the Z-axis direction until they are set to the non-connected positions illustrated in FIGS. 12 to 15. The pressed portions 47 and 48 are positioned relative to the respective pressing portions 45 and 46 in the end portions of the inverter board 20 with respect to the Y-axis direction, and fitted in the respective pressing portions 45 and 46. As a result, the inverter board 20 is properly set to the non-connected position with respect to the X-axis (see FIG. 5). A pair of the pressing portions 45 and 46 and a pair of the pressed portions 47 and 48 are provided at each end portion with respect to the Y-axis direction. The pressing portions 45 and 46 and the pressed portions 47 and 48 are away from each other in the front-rear direction, respectively. The relative positions between the pressing portions 45 and 46 and the respective pressed portions 47 and can be easily visually confirmed.

Figure 13:
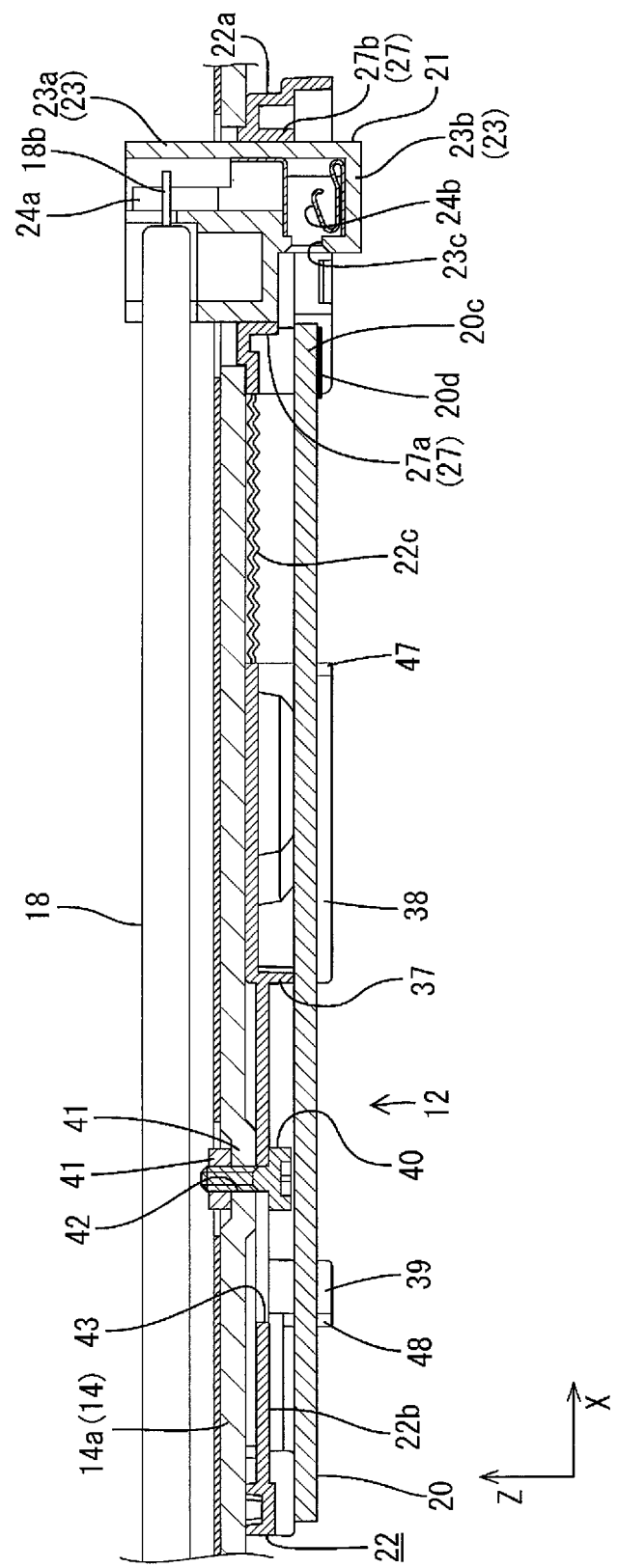
FIG. 13 is a cross-sectional view along line xiii-xiii in FIG. 12 with the inverter board at the non-connected position.
Figure 14:
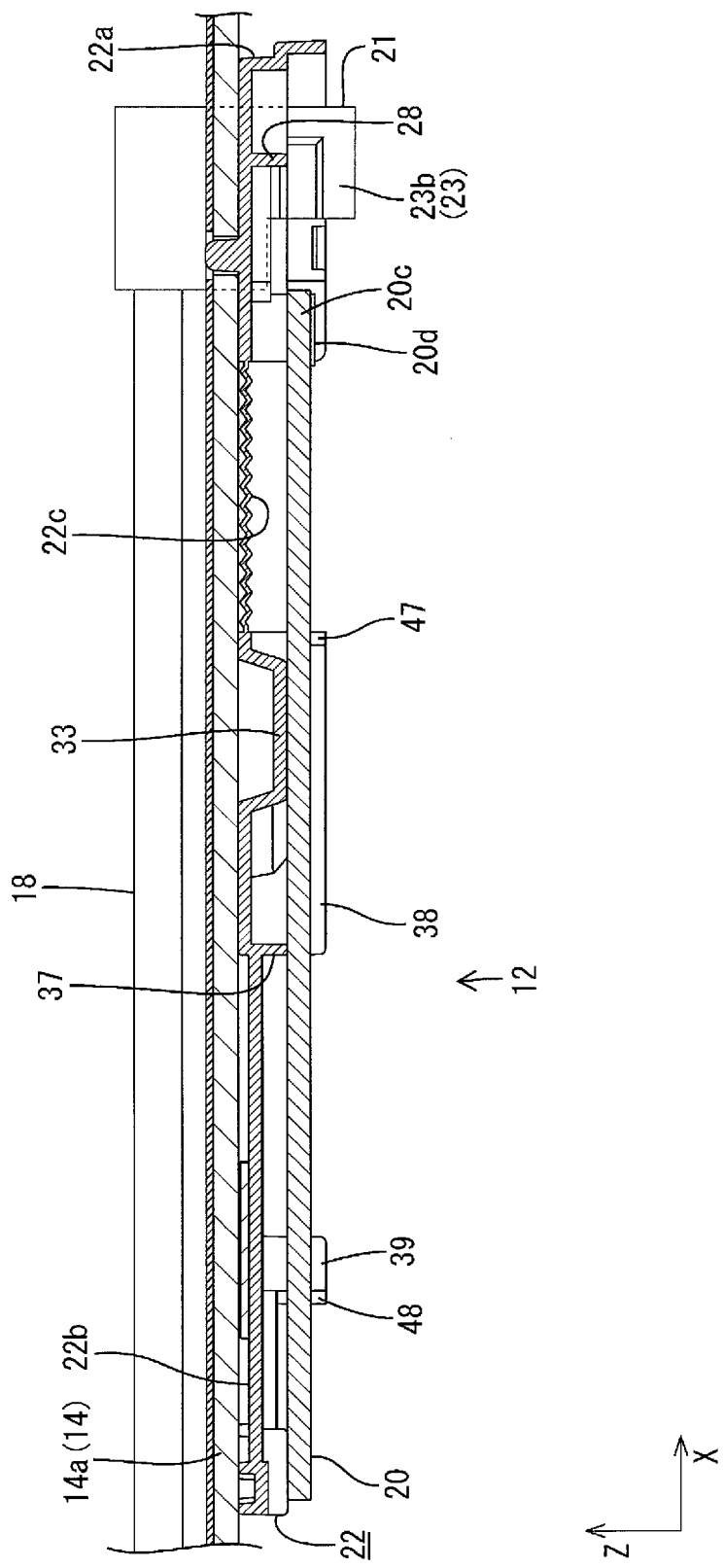
FIG. 14 is a cross-sectional view along line xiv-xiv in FIG. 12 with the inverter board at the non-connected position.
Figure 15:
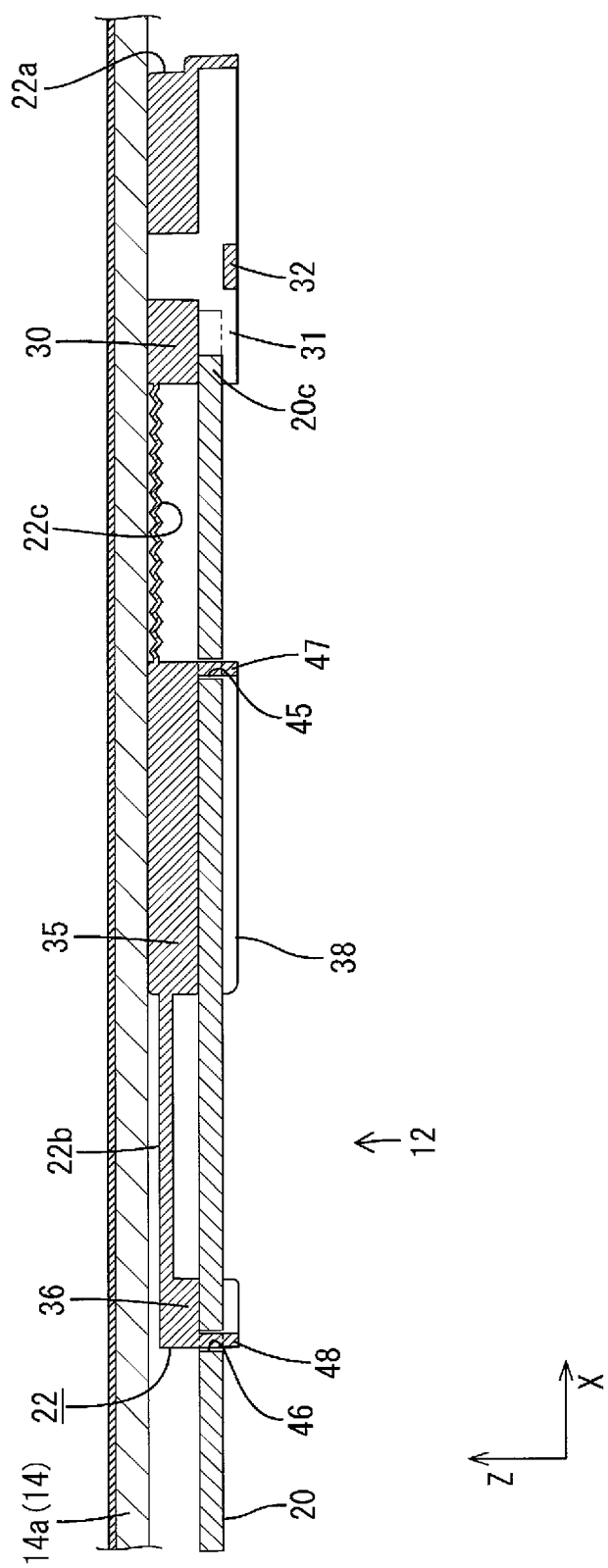
FIG. 15 is a cross-sectional view along line xv-xv in FIG. 12 with inverter board at the non-connected position.

When the inverter board 20 is moved from the removal position to the non-connected position, the side end surfaces of the inverter board 20 with respect to the Y-axis direction are positioned relative to the positioning portions 31, 38 and 39 of the covers 22 as illustrated in FIG. 12. As a result, the inverter board 20 is properly set to the non-connected position with respect to the Y-axis direction (see FIG. 5). As illustrated in FIGS. 13 to 15, when the inverter board 20 is set to the non-connected position, the support projections 33 and the vertical support walls 30, 35, and 36 are in contact with the front surface of the inverter board 20. As a result, the Z-axis positional relationship between the chassis 14 and each cover 22 is determined and the deformations such as warps can be reduced.

The inverter board 20 is two-dimensionally positioned to proper X-axis position and Y-axis position when it is set to the non-connected position. During the movement of the inverter board 20, the chip components 20b and the leads of the lead components 20a that project toward the chassis 14 or the cover 22 are less likely to touch parts of the chassis 14 or the cover 22 (e.g., bosses for fixing the inverter board 20).

Next, each inverter board 20 is moved from the non-connected position to the connected position. When the inverter board 20 is moved from the non-connected position and pushed to the front along the X-axis direction, the connector connecting portions 20c are inserted in the board holding holes 23c of the board holding portions 23b of the relay connectors 21. When the inverter board 20 is moved to the connected position, the board contacts 24b of the terminals 24 of the relay connectors 21 are elastically in contact with the terminals 20d of the connector connecting portions 20c as illustrated in FIGS. 16 to 21. The inverter board 20 is electrically connected to the cold cathode tubes 18 via the relay connectors 21 and power supply to the cold cathode tubes 18 is established.

During the movement of the inverter board 20 from the non-connected position illustrated in FIG. 12 to the connected position illustrated in FIG. 16, the movable portions 22b of the covers 22 follow the movement. Specifically, when the inverter board 20 is pushed from the non-connected position to the front along the X-axis direction, the rear walls of the pressing portions 45 and 46 press the rear end surfaces of the respective pressed portions 47 and 48 that are fitted in the pressing portions 45 and 46. Namely, forward pressing forces are applied to the rear end surfaces of the pressed portions 47 and 48. As a result, the movable portions 22b move from the backward position to the front according to the forward movement of the inverter board 20. During the movement from the non-connected position to the connected position, the relative positions of the inverter board 20 to the movable portions 22b with respect to the X-axis direction and the Y-axis direction do not change, that is, remain constant. Namely, the inverter board 20 is less likely to be displaced relative to the movable portions 22b during the movement thereof for a connection. Therefore, the chip components 20b and the lead components 20a mounted on the movable portions 22b are less likely to be damaged during the movement of the inverter board 20 for a connection.

Figure 17:
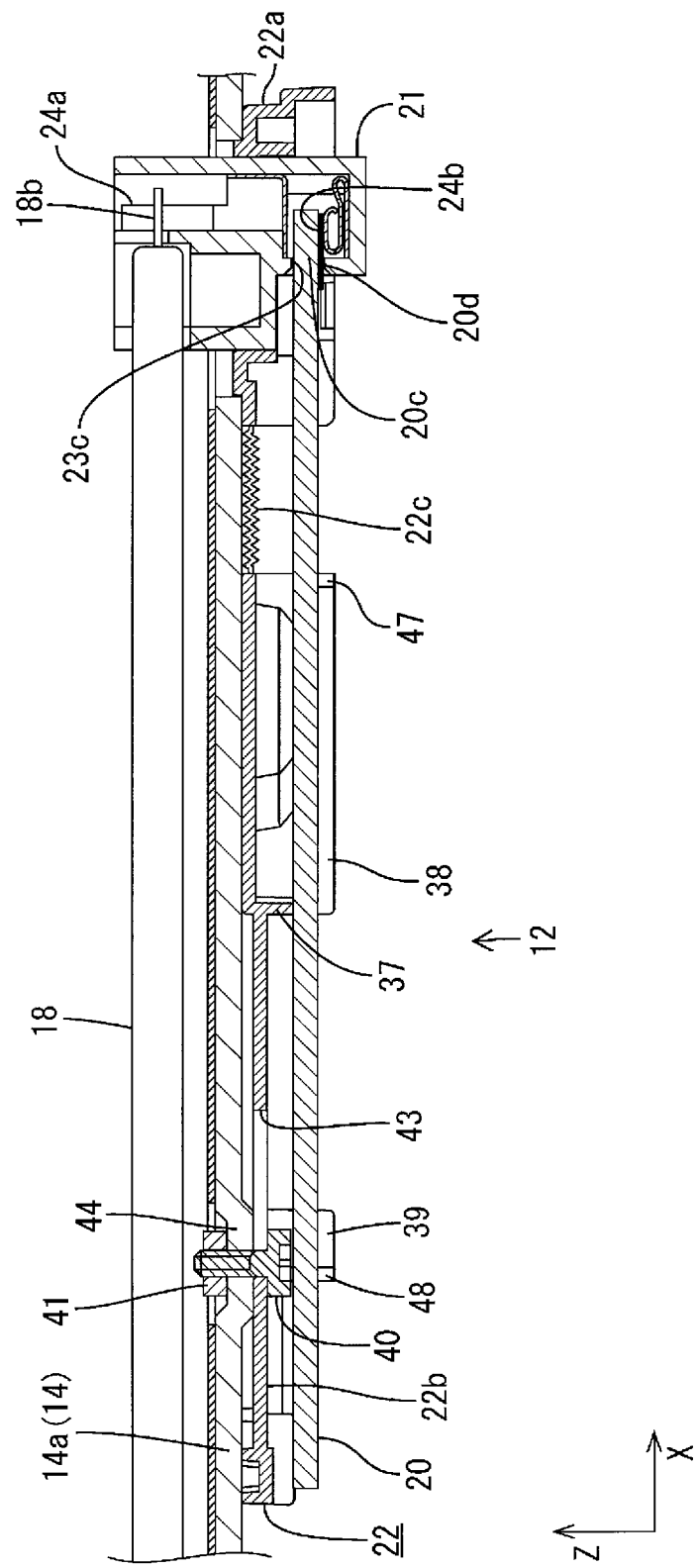
FIG. 17 is a cross-sectional view along line xvii-xvii in FIG. 16 with the inverter board at the connected position.

The movable portions 22b are brought closer to the respective fixed portions 22a, and the flexible portions 22c are elastically contracted during the forward movement. During the forward movement, each bolt hole 43 is moved forward relative to the corresponding bolt 40. The bolt 40 rubs against the edge of the bolt hole 43. Namely, the forward movements of the movable portions 22b are guided. Furthermore, during the forward movement, the positioning portions 31, 38 and 39 are brought in contact with the side end surfaces of the inverter board 20 with respect to the Y-axis direction. With this configuration, the linear movement of the inverter board 20 along the X-axis direction is properly guided without tilting during the movement. When the inverter board 20 is set at the connected position, the movable portions 22b are set at the forward positions as illustrated in FIGS. 16 and 17. Moreover, the further movements of the movable portions 22b are restricted by the bolts 40 that are in contact with the rear edges of the respective bolt holes 43. Namely, the forward movement of the inverter board 20 beyond the connected position is restricted. Under this condition, the inverter board 20 is fixed to the chassis with screws. Each flexible portion 22c changes its state from a free state to an elastically contracted state, and remains in the elastically contracted state.

Figure 18:
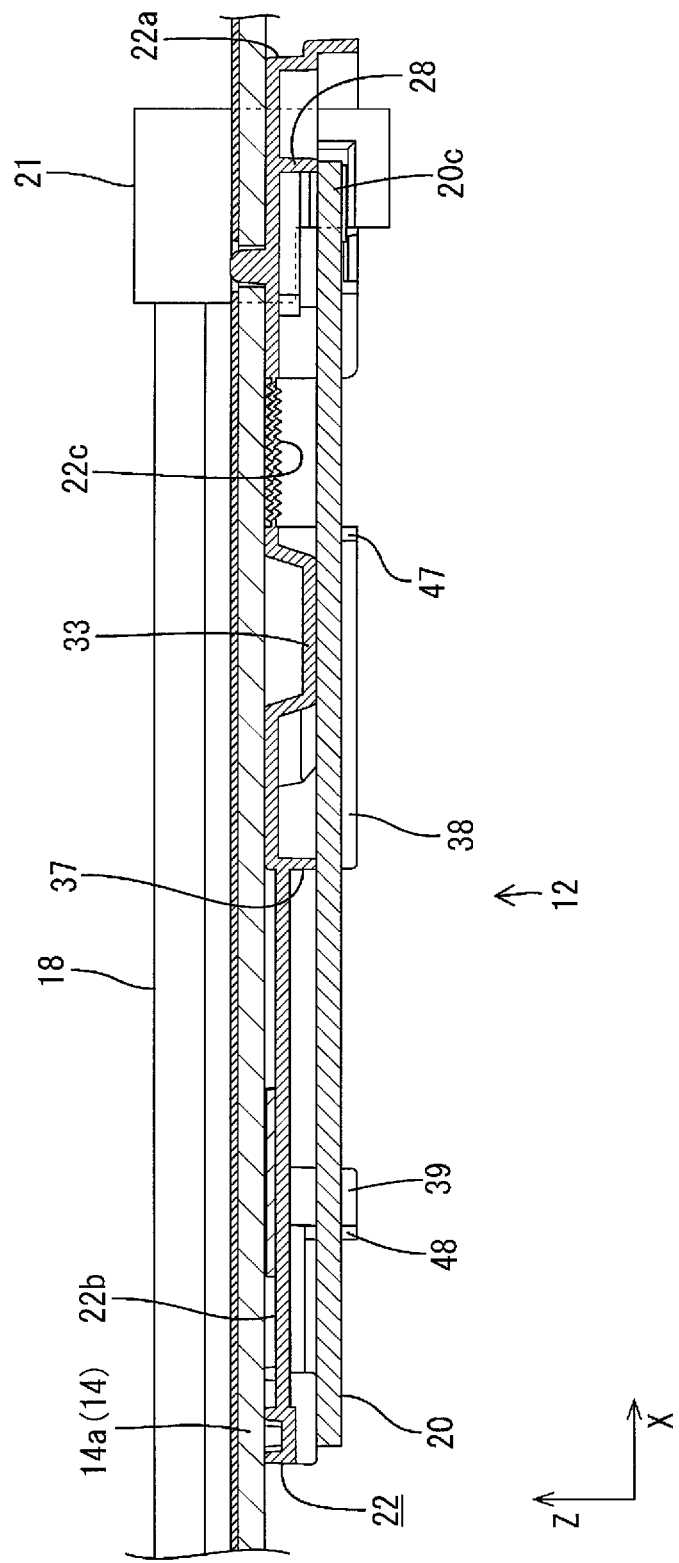
FIG. 18 is a cross-sectional view along line xviii-xviii in FIG. 16 with the inverter board at the connected position.
Figure 19:
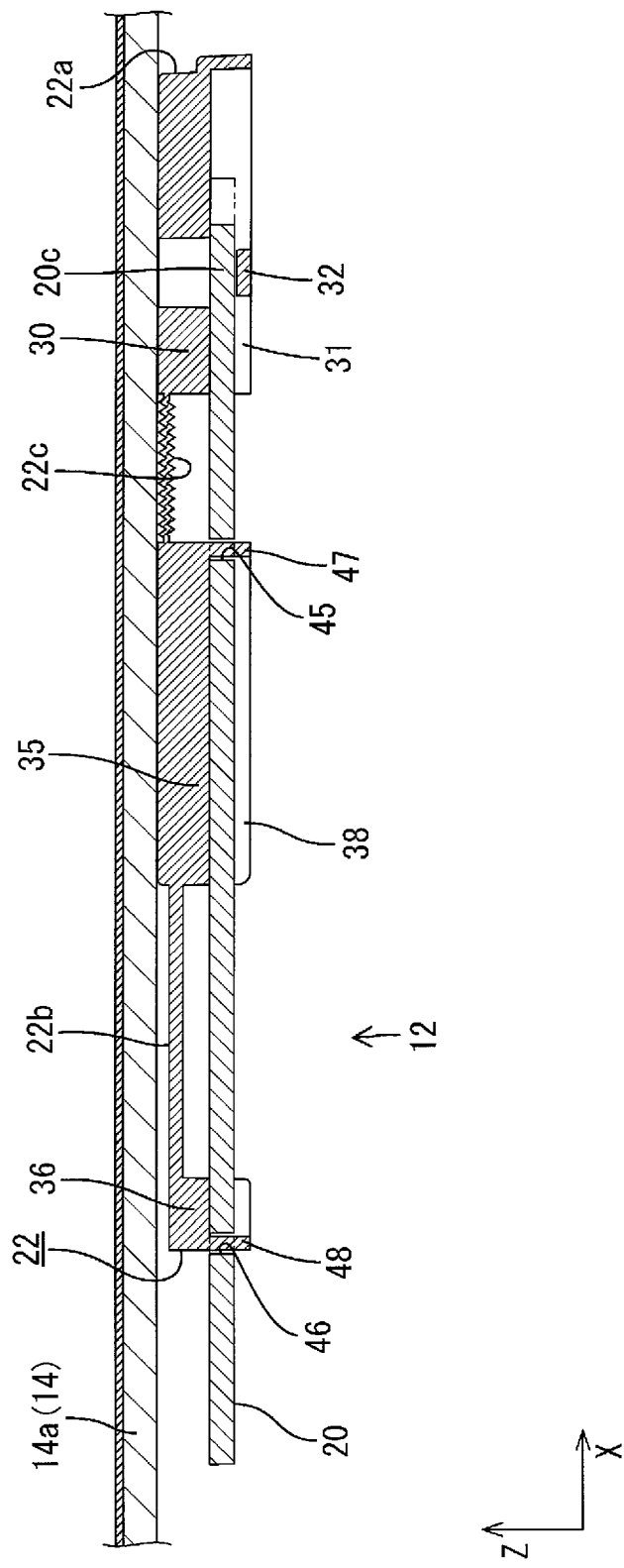
FIG. 19 is a cross-sectional view along line xix-xix in FIG. 16.
Figure 20:
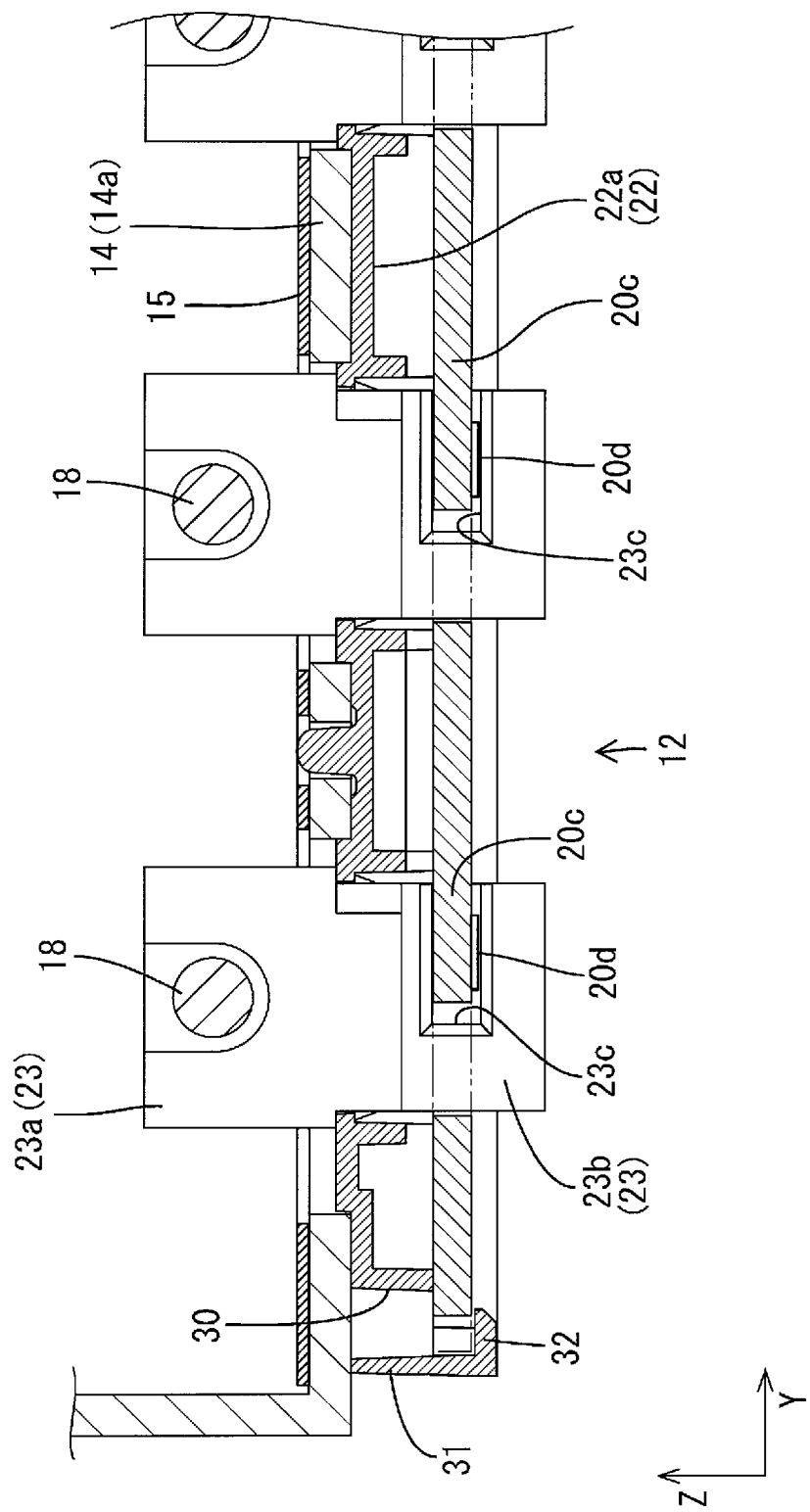
FIG. 20 is a cross-section view along line xx-xx in FIG. 16.
Figure 21:
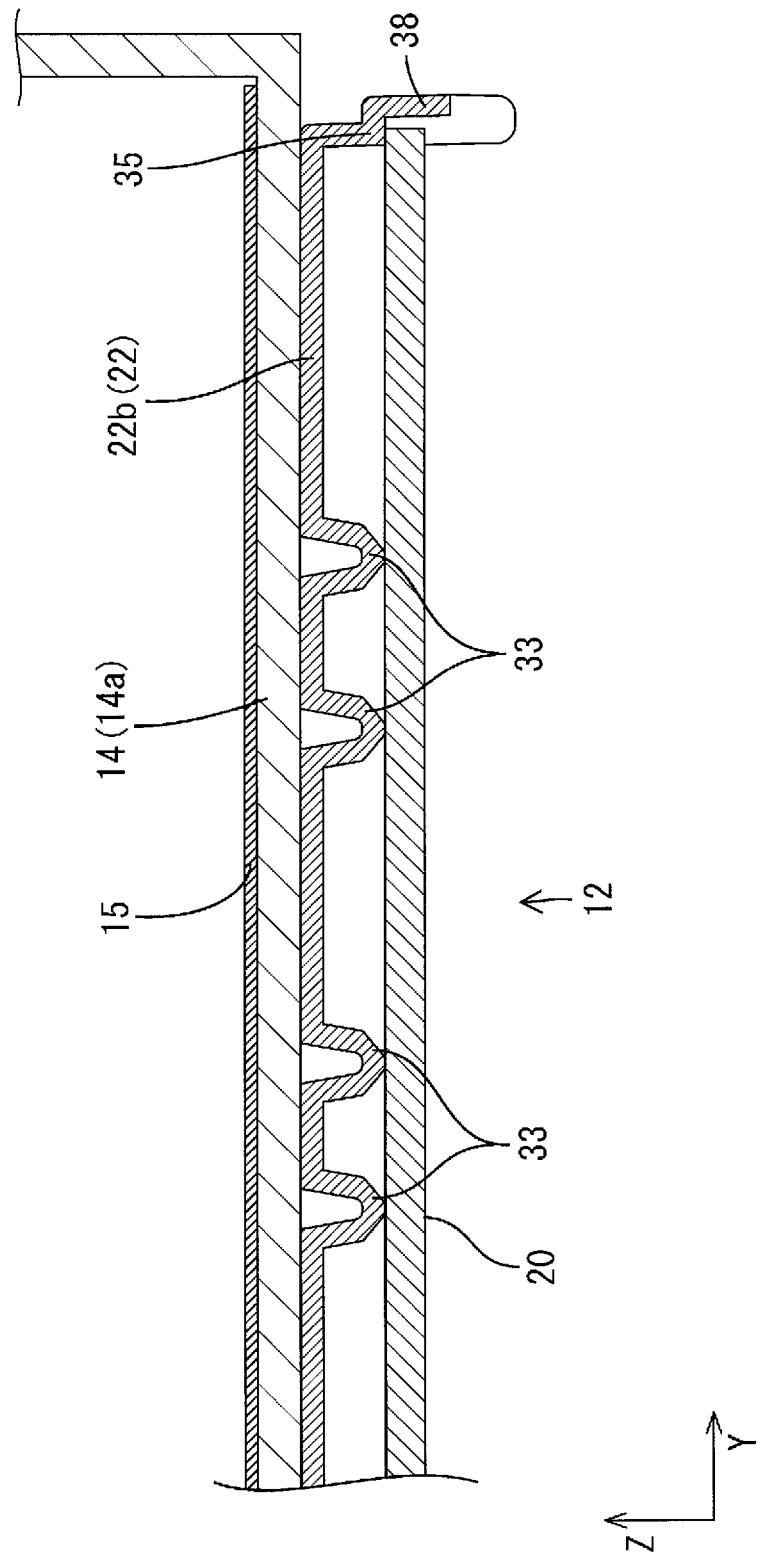
FIG. 21 is a cross-section view along line xxi-xxi in FIG. 16.

As illustrated in FIGS. 19 and 20, when the inverter board 20 is at the connected position, the front end portions of the side end portions are held by the respective board holding portions 32 from the rear. Moreover, as illustrated in FIGS. 17 to 21, the support projections 33 and the support walls 30, 35, 36 and 37 are in contact with the rear surface of the inverter board 20. With this configuration, the inverter board 20 is less likely to deform, or warp, in the Z-axis direction, that is, the direction perpendicular to the board surface. Furthermore, backlashes of the inverter board 20 can be effectively reduced. As illustrated in FIGS. 16 and 18, when the power supply board 20 is at the connected position, the blocking portions 28 of the cover 22 are in contact with the parts of the connector connecting portions 20c of the inverter board 20 outside the relay connectors 21. As a result, the spaces between the adjacent relay connectors 21 are closed. Namely, the front of the spaces between the inverter board 20 and the covers 22 are closed by the blocking portions 28 and the relay connectors 21 without openings. Therefore, foreign substances (including insects and other living substances) entering the spaces between the inverter board 20 and the covers 22 from the front can be properly blocked. An adverse effect is not exerted on connections between the inverter board 20 and the relay connectors 21.

To remove the inverter board 20 for maintenance or other reasons, the inverter board 20 is pulled from the connected position to the non-connected position in a reverse direction to the connecting direction, and disconnected from the relay connectors 21. During the removal, the movable portions 22b follow the removal movement of the inverter board 20. Specifically, when the inverter board 20 is pulled from the connected position to the rear along the X-axis direction, the front walls of the pressing portions 45 and 46 presses the front end surfaces of the respective pressed portions 47 and 48 that are fitted in the pressing portions 45 and 46. Namely, backward pressing forces are applied to the front end surfaces of the pressed portions 47 and 48. As a result, the movable portions 22b move from the forward position to the backward position according to the backward movement of the inverter board 20. During the movement from the connected position to the non-connected position, the relative positions of the inverter board 20 to the movable portions 22b with respect to the X-axis direction and the Y-axis direction do not change, that is, remain constant. Namely, the inverter board 20 is less likely to be displaced relative to the movable portions 22b during the movement thereof for the disconnection. Therefore, the chip components 20b and the leads of the lead components 20a mounted on the movable portions 22b are less likely to be damaged during the movement of the inverter board 20 for the disconnection.

The movable portions 22b are separated from the respective fixed portions 22a and the flexible portions 22c are expanded due to resilience during the backward movement. During the backward movement, each bolt hole 43 is moved backward relative to the corresponding bolt 40. The bolt 40 rubs against the edge of the bolt hole 43. Namely, the backward movements of the movable portions 22b are guided. Furthermore, during the backward movement, the positioning portions 31, 38 and 39 are brought in contact with the side end surfaces of the inverter board 20 with respect to the Y-axis direction. With this configuration, the linear movement of the inverter board 20 along the X-axis direction is properly guided without tilting during the movement. When the inverter board 20 is set at the non-connected position, the movable portions 22b are set at the backward positions as illustrated in FIGS. 12 and 13. Moreover, the further movements of the movable portions 22b are restricted by the bolts 40 that are in contact with the front edges of the respective bolt holes 43. Namely, the backward movement of the inverter board 20 beyond the non-connected position is restricted. Under this condition, the inverter board 20 is brought to the removal position. Each flexible portion 22c returns to the free state.

When the inverter board 20 is moved from the removal position to the non-connected position, the inverter board 20 may beset at a position slightly more to the front than the non-connected position. Even in such a case, the position of the inverter board 20 is still between the non-connected position and the connected position. Therefore, the components on the inverter board 20 are less likely to touch the parts of the chassis 14 or the covers 22.

As described above, the backlight unit 12 in this embodiment includes the cold cathode tubes 18, the chassis 14, the inverter boards 20, the relay connectors 21, and the covers 22. The chassis 14 houses the cold cathode tubes 18. The inverter boards 20 are arranged on the opposite side of the chassis 14 from the cold cathode tubes 18 and configured to supply drive power to the cold cathode tubes 18. The relay connectors 21 are mounted to the chassis 14 such that the inverter boards 20 are connected to or disconnected from the relay connectors 21 by moving them in the direction along the board surface of the inverter boards 20 (the X-axis direction). The relay connectors 21 are configured to relay power supply from the inverter boards 20 to the cold cathode tubes 18. Each cover 22 is arranged between the chassis 14 and the inverter board 20. Each cover 22 has the movable portion 22b that are attached to the chassis so as to be movable along the connecting direction and the disconnecting direction of the inverter board 20 to or from the relay connectors 21 (the X-axis direction).

The covers 22 are arranged between the chassis 14 and the respective inverter boards 20. Each inverter board 20 can be connected to or disconnected from the relay connectors 21 by moving it in one direction along the board surface thereof. Each cover 22 has the movable portion 22b that is attached to the chassis 14 so as to be movable along the connecting direction and the disconnecting direction of the inverter board 20. The movable portion 22b follows the movement of the inverter board 20 for the connection or the disconnection. Therefore, the inverter board 20 is less likely to be displaced relative to the movable portions 22b of the covers 22 during the movement for the connection or the disconnection. Furthermore, the components mounted on the inverter board 20 are less likely to be damaged by the covers 22 during the movement for the connection or the disconnection. Therefore, good stability can be achieved in performance of the backlight unit 12 and the liquid crystal display device 10 and thus the yield rate improves. Furthermore, an additional work for replacing the defective inverter board 20 with a new one is not required. Therefore, a manufacturing cost can be decreased and work efficiency can be improved.

More preferably, the lighting device of this embodiment may include the following configurations.

(1) Each cover 22 has the fixed portion 22a that is fixed to the chassis 14 at the location closer to the relay connectors 21 than the movable portion 22b. With the fixed portion 22a fixed to the chassis 14 at the location closer to the relay connectors 21 than the movable portion 22b, the functionality of the cover 22 relative to the relay connectors 21 can be improved.

(2) Each cover 22 has the flexible portions 22c connected between the movable portion 22b and the fixed portion 22a. The flexible portions 22c can expand or contract in the connecting direction or the disconnecting direction of the inverter board 20. With this configuration, the fixed portion 22*a* and the movable portion 22*b* are connected via the flexible portions 22*c*. Therefore, the fixed portion 22*a* and the movable portion 22*b* can be handled as a single part. With the flexible portions 22*c* that can expand and contract, the movement of the movable portion 22*b* relative to the fixed portion 22*a* is allowed.

(3) The flexible portion 22*c*, the movable portion 22*b*, and the fixed portion 22*a* are integrally provided. In comparison to flexible portions, a movable portion, and a fixed portion that are separately prepared and assembled into one part, the cost can be reduced.

(4) The flexible portions 22*c* are arranged at locations off the relay connectors 21 with respect to the direction parallel to the board surface of the inverter board 20 and perpendicular to the connecting direction and the disconnecting direction of the inverter board 20. With this configuration, the flexible portions 22*c* that contract are less likely to exert adverse effects on the connections between the inverter board 20 and the relay connectors 21.

(5) A plurality of the relay connectors 21 are arranged parallel to each other along the direction parallel to the board surface of the inverter board 20 and perpendicular to the connecting direction and the disconnecting direction of the inverter board 20. A plurality of the flexible portions 22*c* are arranged separately from each other and parallel to each other along the parallel arrangement direction of the relay connectors 21. With the flexible portions 22*c* arranged parallel to each other, sufficient connection strength can be achieved between the fixed portion 22*a* and the movable portion 22*b*.

(6) Each flexible portion 22*c* has alternate peaks and valleys alternately along the connecting direction of the inverter board 20 and connected to one another. The flexible portion 22*c* expands and contracts as the peaks and the valleys deform.

(7) Each flexible portion 22*c* is elastically deformable. When the flexible portion 22*c* is expanded or contracted, the flexible portion 22*c* tries to return to its original shape due to resilience. This provides good workability.

(8) The chassis 14 has the connector insertion holes 14*b* that are through holes in which the respective relay connectors 21 are passed. Each fixed portion 22*a* has connector holes 25 that are through holes continuing into the respective connector insertion holes 14*b* and in which the respective relay connectors 21 are fitted. With this configuration, the relay connectors 21 are mounted while the relay connectors 21 passed through the connector insertion holes 14*b* of the chassis 14 and the connector holes 25 of the fixed portions 22*a*.

(9) Each connector insertion hole 14*b* is larger than the connector hole 25. With this configuration, sufficient distances are provided between the relay connector 21 and the edges of the connector insertion hole 14*b* of the chassis 14. Therefore, even when high voltage currents flow through the relay connectors 21, the currents are less likely to leak to the chassis 14 side.

(10) The holding protrusions 26 that are fitted in the respective connector insertion holes 14*b* are provided on the fixed portions 22*a*. Each holding protrusion 26 is arranged between the edges of the corresponding connector insertion hole 14*b* of the chassis 14 and the corresponding relay connector 21. Therefore, the relay connecters 21 are properly insulated from the chassis 14. Furthermore, the fixed portions 22*a* can be positioned relative to the chassis 14.

(11) The connector holes 25 are arranged in the fixed portions 22*a* so as to be parallel to each other in the direction parallel to the board surface of the inverter board 20 and perpendicular to the connecting direction and the disconnecting direction. The blocking portions 28 project from the parts of the fixed portions 22*a* between the adjacent connector holes 25 toward the inverter board 20. The blocking portions 28 are in contact with the inverter board 20. With this configuration, foreign substances entering the spaces between the inverter board 20 and the fixed portions 22*a* from the front with respect to the connecting direction through the spaces between the adjacent relay connectors 21 are blocked.

(12) The blocking portions 28 are arranged so as to be in contact with the front end portion of the inverter board 20 with respect to the connecting direction. With this configuration, the inverter board 20 is properly kept from touching foreign substances.

(13) The ribs 27 project from the edges of the connector holes 25 toward the inverter board 20. The blocking portions 28 are connected to the ribs 27. With the ribs 27 and the blocking portions 28 connected with each other, no gaps are present on the front with respect to the connecting direction. Therefore, foreign substances are properly blocked. Furthermore, high strength can be achieved.

(14) The front positioning portions 31 are provided in the fixed portions 22*a*. When the front positioning portions 31 are in contact with the inverter board 20, the inverter board 20 is positioned with respect to the direction parallel to the board surface of the inverter board 20 and perpendicular to the connecting direction and the disconnecting direction. With the front positioning portions 31, the inverter board 20 is positioned with respect to the direction perpendicular to the connecting direction and the disconnecting direction. During the connection or the disconnection of the inverter board 20, the movement of the inverter board 20 is guided by the front positioning portions 31. Therefore, the inverter board 20 can be stably moved.

(15) The board stoppers 31 are provided in the fixed portions 22*a*. The board stoppers 31 are in contact with the inverter board 20 from an opposite side from the chassis 14. With the board stoppers 32, the inverter board 20 is less likely to be deformed toward the opposite side from the chassis 14.

(16) The board stoppers 32 are arranged so as to be in contact with the front end portion of the inverter board 20 with respect to the connecting direction. The front end portion of the inverter board 20 at the connected position with respect to the connecting direction is held by the board stoppers 32. With this configuration, the reliability in connections between the inverter board 20 and the relay connectors 21 improves.

(17) The pressing portions 45 and 46 are provided in the inverter board 20, and the pressed portions 47 and 48 are provided on the movable portions 22*b*. The pressed portions 47 and 48 are pressed by the pressing portions 45 and 46 during the connection or the disconnection of the inverter board 20 to or from the relay connectors 21. During the connection or the disconnection of the inverter board 20, the pressed portions 47 and 48 are pressed by the pressing portions 45 and 46. The movable portions 22*b* follow the movement of the inverter board 20 for the connection or the disconnection. Namely, the relative positions between the inverter board 20 and the movable portions 22*b* remain constant.

(18) The pressing portions 45 and 46 and the respective pressed portions 47 and 48 are fitted together. The pressing forces are applied while the pressing portions 45 and 46 and the respective pressed portions 47 and 48 are fitted together.

(19) The inverter board 20 is movable between the non-connected position and the connected position along one direction parallel to the board surface. The inverter board 20 is disconnected from the relay connectors 21 at the non-connected position and connected to the relay connectors 21 at the connected position. When the inverter board 20 is at the non-connected position, the rear end surfaces of the pressed portions 47 and 48 are in contact with the rear walls of the pressing portions 45 and 46 with respect to the connecting direction of the inverter board 20 to the relay connectors 21. With this configuration, the movable portions 22b follow the movement of the inverter board 20 from the non-connected position to the connected position and move in the connecting direction. Furthermore, with the rear end surfaces of the pressed portions 47 and 48 in contact with the rear walls of the pressing portions 45 and 46 during the setting of the inverter board 20 to the non-connected position, the inverter board 20 is positioned with respect to the connecting direction.

(20) The inverter board 20 is movable between the non-connected position and the connected position along one direction parallel to the board surface. The inverter board 20 is disconnected from the relay connectors 21 at the non-connected position and connected to the relay connectors 21 at the connected position. When the inverter board 20 is at the non-connected position, the front and the rear end surfaces of the pressed portions 47 and 48 are in contact with the front and the rear walls of the pressing portions 45 and 46 with respect to the connecting direction of the inverter board 20 to the relay connectors 21. With this configuration, the movable portions 22b follow the movement of the inverter board 20 from the non-connected position to the connected position, and move in the connecting direction or the disconnecting direction. Furthermore, with the front and the rear end surfaces of the pressed portions 47 and 48 in contact with the front and the rear walls of the pressing portions 45 and 46 during the setting of the inverter board 20 to the non-connected position, the inverter board 20 is positioned with respect to the connecting direction or the disconnecting direction.

(21) The pressed portions 47 and 48 are protrusions that project from the movable portions 22b toward the inverter board 20. The pressing portions 45 and 46 are recesses that receive the pressed portions 47 and 48. For pressing portions that are protrusions provided on the inverter board, special design is required. In comparison to such a configuration, the pressing portions 45 and 46 can be formed in the inverter board 20 at low cost.

(22) The pressing portions 45 and 46 are formed by cutting out parts of the inverter board 20. Whether the pressed portions 47 and 48 are inside the pressed portions 45 and 46 can be confirmed by visually inspecting the inverter board 20 from the opposite side from the chassis 14. This provides high workability.

(23) The pressing portions 45 and 46 in a pair and the pressed portions 47 and 48 in a pair are away from each other in the front-rear direction with respect to the connecting direction of the inverter board 20 to the relay connectors 21. The pressing forces are applied to each movable portion 22b at two different locations that are away from each other in the front-rear direction. Therefore, the movable portion 22b more consistently follow the movement of the inverter board 20.

(24) The pressing portions 45 and 46 and the pressed portions 47 and 48 are arranged in the end portion with respect to the direction parallel to the board surface of the inverter board 20 and perpendicular to the connecting direction and the disconnecting direction (the Y-axis direction). In comparison to the pressing portions and the pressed portions arranged in the middle portion with respect to the Y-axis direction, the design of layouts of the wiring patterns and the components on the inverter board 20 is less likely to be limited.

(25) The pressing portions 45 and 46 and the pressed portions 47 and 48 are arranged in the end portions with respect to the direction parallel to the board surface of the inverter board 20 and perpendicular to the connecting direction and the disconnecting direction (the Y-axis direction). In comparison to the pressing portions and the pressed portions arranged in the middle portion with respect to the Y-axis direction, the design of layouts of the wiring patterns and the components on the inverter board 20 is less likely to be limited. Furthermore, the pressing forces are applied to each movable portion 22b at the end portions with respect to the direction perpendicular to the connecting direction. Therefore, the movable portions 22b more properly follow the movement of the inverter board 20.

(26) The bolts 40 are used as the attaching members with which the movable portions 22b are attached to the chassis 14 and held. The movable portions 22b have the bolt holes 43 through which the bolts 40 are passed. The bolt holes 43 are formed such that the clearances are provided between the edges of the bolt holes 43 and the respective bolts 40 with respect to the connecting direction and the disconnecting direction. The movable portions 22b can be moved relative to the chassis 14 in the ranges corresponding to the clearances between the edges of the bolt holes 43 and the bolts 40 while the movable portions 22b are still attached to the chassis 14 with the bolts 40.

(27) The inverter board 20 is movable between the non-connected position and the connected position along one direction parallel to the board surface. The inverter board 20 is disconnected from the relay connectors 21 at the non-connected position and connected to the relay connectors 21 at the connected position. Each bolt hole 43 is formed such that the clearance is substantially equal to or larger than the moving distance of the inverter board 20 between the non-connected position and the connected position. With this configuration, the movable portions 22b can consistently follow the movement of the inverter board 20 while the inverter board 20 is moved between the non-connected position and the connected position.

(28) Each cover 22 includes the fixed portion 22a and the flexible portions 22c. The fixed portions 22a are fixed to the chassis 14 at the location closer to the relay connectors 21 than the movable portions 22b. The flexible portions 22b are connected between the movable portion 22b and the fixed portion 22a. The flexible portions 22b can expand and contract in the connecting direction and the disconnecting direction. The mounting holes 43 are formed such that the edges are in contact with the bolts 40 when the flexible portions 22c expanded to the maximum length or to the length immediately before contraction starts. As a result, the movement of the movable portion 22b is restricted. When the movable portion 22b is moved and the flexible portions 22c are expanded to the maximum strength or to the length immediately before the contraction starts, the edges of the mounting holes 43 are in contact with the bolts 40 and the movement of the movable portion 22b is restricted. Therefore, problems such as damages to the flexible portions 22c are less likely to occur.

(29) The positioning portions 38 and 39 are provided in the movable portions 22b. The positioning portions 38 and 39 are in contact with the inverter board 20 and position the inverter board 20 with respect to the direction parallel to the board surface of the inverter board 20 and perpendicular to the connecting direction and the disconnecting direction. With the positioning portions 38 and 39, the inverter board 20 is positioned with respect to the direction perpendicular to the connecting direction and the disconnecting direction.

(30) The support projections 33, the vertical support walls 35 and 36, the horizontal support walls 37 project from the movable portions 22b toward the inverter board 20. They are in contact with the inverter board 20 and support the inverter board 20. With this configuration, the preferable positional relationship between the chassis 14 and the inverter board 20 with respect to the direction perpendicular to the board surface of the inverter board 20 can be maintained.

The present invention is not limited to the first embodiment explained above. The following modification may be included in the technical scope of the present invention, for example. Similar parts of the following modification to the above embodiment will be indicated by the same symbols and may not be illustrated or explained.

First Modification

The first modification of the first embodiment of the backlight unit 12 will be explained with reference to FIG. 22. Different flexible portions 22c-1 will be explained.

Figure 22:
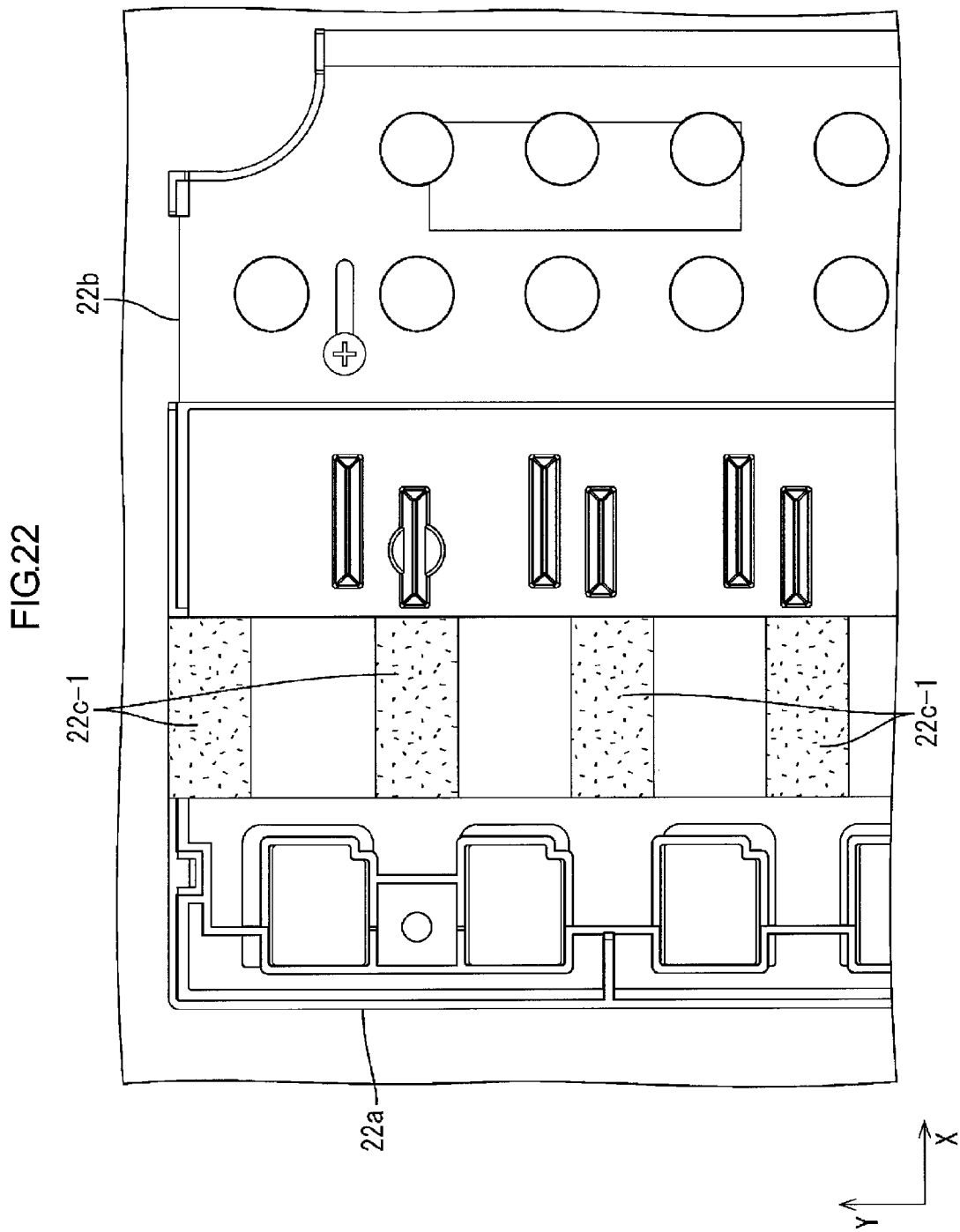
FIG. 22 is a magnified partial bottom view of a cover according a first modification of the first embodiment of the present invention.

As illustrated in FIG. 22, the flexible portions 22c-1 are made of different material from the fixed portion 22a and the movable portion 22b. The flexible portions 22c-1 are connected to the fixed portion 22a and the movable portion 22b by bonding or welding. The flexible potions 22c-1 are integrally provided with the fixed portion 22a and the movable portion 22b. The flexible portions 22c-1 are made of rubber, for example. Therefore, the flexible portions 22c-1 can elastically expand and contract. With such flexible portions 22c-1, the fixed portion 22a and the movable portion 22b can be handled as a single part. Moreover, front-rear movements of the movable portion relative to the fixed portion 22a are allowed.

Other Embodiment

The present invention is not limited to the above embodiments explained in the above description. The following embodiments may be included in the technical scope of the present invention, for example.

(1) In the above embodiments, the movable portions are movable in both connecting direction and disconnecting direction. However, they may be movable only in the connecting direction. Specifically, contracting portions that can only contract may be provided instead of the flexible portions. With this configuration, the movable portions can be moved only in the connecting direction.

(2) In the above embodiments, the fixed portion, the movable portion, and the flexible portions are integrally formed or separately formed. However, the flexible portions and the fixed portion may be integrally formed and the movable portion separately prepared may be connected by bonding so as to be provided as a single part. Alternatively, the flexible portions and the movable portions are integrally formed and the fixed portion separately prepared may be connected by bonding so as to be provided as a single part.

(3) Other than the above embodiments, the fixed portion, the movable portion, and the flexible portions are made of the same material and prepared as separate parts, and then they may be assembled into a single part.

(4) In the above embodiments, the flexible portions are in the free states when the movable portion is at the backward position. However, the flexible portions may be configured such that they are in the free states when the movable portion is at the forward position, or when the movable portions is between the forward position and the backward position.

(5) In the above embodiments, the flexible portions are arranged at the locations off the relay connectors with respect to the Y-axis direction. However, the flexible portions may be arranged over parts or entire parts of the relay connectors with respect to the Y-axis direction.

(6) The number of the flexible portions or the Y-axis dimension of each flexible portion can be altered from the above embodiments. For example, the Y-axis dimension of each flexible portion may be set equal to that of the fixed portion or the movable portion, and only one flexible portion may be provided.

(7) The configuration of the flexible portions may be altered from the above embodiment as necessary. The flexible portions that do not elastically deform may be used.

(8) In the above embodiments, the front and the rear end surfaces of the pressed portions of the follow-up structures are in contact with the front and the rear walls of the pressing portions of the follow-up structures when the inverter board is at the non-connected position. However, only the rear end surfaces of the pressed portions may be in contact with the rear walls of the pressing portions and clearances may be provided between the front end surfaces and the front walls when the inverter board is at the non-connected position. With this configuration, the movable portion always follows the movement of the inverter board for the connection but it does not follow the movement of the inverter board for the disconnection at least for a certain amount of time. Furthermore, only the front end surfaces of the pressed portions may be in contact with the front walls of the pressing portions and clearances may be provided between the rear end surfaces and the rear walls when the inverter board is at the non-connected position. With this configuration, the movable portion always follows the movement of the inverter board for the disconnection but it does not follow the movement of the inverter board for the connection at least for a certain amount of time.

(9) In the above embodiments, the follow-up structures include the pressed portions that are protrusions provided on the movable portion and the pressing portions that are recesses provided in the inverter board. However, the follow-up structures may include the pressed portions that are recesses provided in the movable portion and the pressing portions that are protrusions provided on the inverter board. Furthermore, a pair of pressing portion and pressed portion that are a recess and a protrusion engaged the other way around with respect to other pairs.

(10) In the above embodiments, each pressing portion is formed by cutting out a part of the inverter board. However, each pressing portion may be formed by denting a part of the front surface of the inverter board. Each pressed portion that is a recess may be formed in the movable portion in the same manner. Each pressed portion may be formed by denting a part of the rear surface of the movable portion.

(11) In the above embodiments, the follow-up structures include four pairs of the pressing portions and the pressed portions away from each other in the front-rear direction and provided in the respective end portions of the inverter board. However, the number and the locations thereof may be altered as necessary.

(12) In the above embodiments, the follow-up structures including the pressing portions and the pressed portions are provided. However, the follow-up structures may not be provided. In that case, the movable portion may be moved through a manual operation by a person who are connecting or disconnecting the inverter board. A holding portion used for the manual operation may be provided.

(13) In the above embodiments, the attaching structures with which the movable portion is attached to the chassis include the bolts and the bolt holes formed such that the clearances between the edges of each bolt hole and the corresponding bolt with respect to the X-axis direction is substantially equal to the travel distance of the inverter board. However, the bolt holes may be formed such that the clearances are larger or smaller than the travel distance of the inverter board.

(14) The attaching structures with which the movable portion is attached to the chassis can be altered from the above embodiments as necessary.

(15) In the above embodiments, each cover includes the flexible portions. However, the cover may not include the flexible portions. The cover may be constructed from two parts including the fixed portion and the movable portion that separated and independent from each other. Furthermore, the cover may include only the movable portion without the fixed portions.

(16) In the above embodiments, each connector insertion hole of the chassis is larger than the connector hole of the cover. However, the connector insertion hole and the connector holes may be formed in the same size or having an opposite size-relationship. In that case, the holding protrusions of the cover may not be provided.

(17) In the above embodiments, the rear end portions of the first positioning protrusions are in contact with the rear end edges of the first positioning recesses when the inverter board is at the connected position. However, the rear end portions may not be in contact with the rear edges. In that case, the movement of the inverter board to the front is restricted by the front end surfaces of the connector connecting portions held against the extending portions of the front walls.

(18) In the above embodiments, the covers include the support projections, the vertical support walls, and the horizontal support walls. However, one or more, even all, of them may not be included. The number, shapes, and arrangements of the board support portions may be altered as necessary.

(19) In the above embodiments, the first positioning protrusions are connected to the second positioning portions. However, they may be separately and independently provided.

(20) In the above embodiments, the board stoppers are in contact with the front end portions of the inverter boards. However, the board stoppers may be in contact with portions of the inverter boards other than the front end portions. Furthermore, the board stoppers may not be included.

(21) In the above embodiments, two covers are attached to the chassis along a corresponding long-side end of the chassis. However, one, three or more covers may be used. When only one cover is used, a pair of the second blocking portions and a pair of the second positioning portions may be provided. They may be arranged at the respective ends of the cover with respect to the Y-axis direction.

(22) In the above embodiments, each inverter board is directly connected to the relay connectors. However, a relay board electrically connected to the inverter board via an FPC may be connected to the relay connectors such that the inverter board is indirectly connected to the relay connecters.

(23) In the above embodiments, each inverter board is provided for the electrodes at the respective ends of the cold cathode tubes. However, one of the inverter boards may not be provided and the cold cathode tubes may be driven by a single inverter board on one side. In that case, the relay connectors on a side on which the inverter board is not provided (i.e., on a lower potential side) may be connected to a grounding circuit.

(24) In the above embodiments, each cold cathode tube includes the outer lead extending from the ends of the glass tube, and the outer leads are connected to the connectors. However, ferrules connected to the outer leads may be fitted onto the glass tube, and the ferrules may be connected to the connectors.

(25) In the above embodiments, the cold cathode tubes that are one kind of fluorescent tubes are used as light sources. However, other types of fluorescent tubes including hot cathode tubes can be used. Furthermore, discharge tubes (e.g., mercury lamps) other than the fluorescent tubes can be used.

(26) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to white-and-black liquid crystal display devices other than the color liquid crystal display device.

(27) In the above embodiments, the liquid crystal display device including the liquid crystal panel as a display component is used. However, the present invention can be applied to display devices including other types of display components.

(28) In the above embodiments, the television receiver including the tuner is used. However, the technology can be applied to a display device without the tuner.

The invention claimed is:

1. A lighting device comprising:
a light source;
a chassis housing the light source;
a power supply board arranged on a chassis side opposite from the light source and configured to supply drive power to the light source;
at least one relay connector mounted to the chassis such that the power supply board is connected thereto in one direction along a board surface of the power supply board so as to be removable in the direction, and configured to relay power supply from the power supply board to the light source; and
a cover arranged between the chassis and the power supply board, the cover including a movable portion attached to the chassis so as to be movable along at least one of a connecting direction of the power supply board to the at least one relay connector and a disconnecting direction of the power supply board from the at least one relay connector.

2. The lighting device according to claim 1, wherein the cover further includes a fixed portion fixed to the chassis at a location closer to the at least one relay connector than the movable portion.

3. The lighting device according to claim 2, wherein the cover further includes at least one flexible portion connected between the movable portion and the fixed portion, the at least one flexible portion being capable of expanding and contracting in at least one of the connecting direction and the disconnecting direction.

4. The lighting device according to claim 3, wherein the at least one flexible portion, the movable portion, and the fixed portion are integrally formed.

5. The lighting device according to claim 3, wherein the at least one flexible portion is arranged at a location off the at least one relay connector with respect to a direction along the board surface of the power supply board and perpendicular to the connecting direction and the disconnecting direction.

6. The lighting device according to claim 5, wherein:
the at least one relay connector includes a plurality of relay connectors arranged in the direction along the board surface of the power supply board and perpendicular to the connecting direction and the disconnecting direction so as to be parallel to each other; and the at least one flexible portion includes a plurality of flexible portions along a parallel arrangement direction of the relay connectors so as to be separate from each other and parallel to each other.

7. The lighting device according to claim 3, wherein the at least one flexible portion has alternate peaks and valleys connected to one another along the connecting direction and the disconnecting direction of the power supply board.

8. The lighting device according to claim 3, wherein the at least one flexible portion is elastically deformable.

9. The lighting device according to claim 2, wherein:
the chassis has at least one connector insertion hole that is a through hole through which the at least one relay connector is passed; and
the fixed portion has at least one connector hole that is a through hole continuing into the at least one connector insertion hole and in which the at least one relay connector is fitted.

10. The lighting device according to claim 9, wherein the at least one connector insertion hole is larger than the at least one connector hole.

11. The lighting device according claim 10, wherein the cover further includes a holding protrusion on the fixed portion, the holding protrusion being fitted in the connector insertion hole.

12. The lighting device according to claim 9, wherein:
the at least one connector insertion hole includes a plurality of connector insertion holes arranged in the fixed portion in the direction along the board surface of the power supply board and perpendicular to the connecting direction and the disconnecting direction; and
the cover further includes a blocking portion that projects from a part of the fixed portion between the adjacent connector holes toward the power supply board and is in contact with the power supply board.

13. The lighting device according to claim 11, wherein the blocking portion is in contact with a front end portion of the power supply board with respect to the connecting direction.

14. The lighting device according to claim 12, wherein:
the cover further includes a rib that projects from an edge of the at least one connector hole toward the power supply board; and
the blocking portion is connected to the rib.

15. The lighting device according to claim 2, wherein the fixed portion includes a positioning portion that is in contact with the power supply board and positions the power supply board with respect to the direction along the board surface of the power supply board and perpendicular to the connecting direction and the disconnecting direction.

16. The lighting device according to claim 2, wherein the fixed portion includes a board stopper that is in contact with an opposite side of the power supply board from the chassis.

17. The lighting device according to claim 16, wherein the board stopper is in contact with a front end portion of the power supply board with respect to the connecting direction.

18. The lighting device according to claim 1, wherein:
the power supply board includes at least one pressing portion; and
the movable portion includes at least one pressed portion that is pressed by the at least one pressing portion during a connection of the power supply board to the at least one relay connector or a disconnection of the power supply board from the at least one relay connector.

19. The lighting device according to claim 18, wherein the at least one pressing portion and the at least one pressed portion are fitted together.

20. The lighting device according to claim 19, wherein:
the power supply board is movable between a non-connected position and a connected position in one direction along the board surface thereof, the power supply board being disconnected from the at least one relay connector at the non-connected position and connected to the at least one relay connector at the connected position; and
a rear end surface of the at least one pressing portion with respect to the connecting direction of the power supply board to the at least one relay connector is in contact with a rear end surface of the at least one pressed portion with respect to the connecting direction with the power supply board at the non-connected position.

21. The lighting device according to claim 19, wherein:
the power supply board is movable between a non-connected position and a connected position in one direction along the board surface thereof, the power supply board being disconnected from the at least one relay connector at the non-connected position and connected to the at least one relay connector at the connected position; and
a front end surface and a rear end surface of the at least one pressing portion with respect to the connecting direction of the power supply board to the at least one relay connector is in contact with a front end surface and a rear end surface of the at least one pressed portion with respect to the connecting direction, respectively, with the power supply board at the non-connected position.

22. The lighting device according to claim 19, wherein:
the at least one pressed portion is a protrusion that projects from the movable portion toward the power supply board; and
the at least one pressing portion is a recess that receives the at least one pressed portion.

23. The lighting device according to claim 22, wherein the at least one pressing portion is formed by cutting out a part of the power supply board.

24. The lighting device according to claim 18, wherein:
the at least one pressing portion includes two pressing portions away from each other in a front-rear direction with respect to the connecting direction of the power supply board to the at least one relay connector; and
the at least one pressed portion includes two pressed portions away from each other in a front-rear direction with respect to the connecting direction of the power supply board to the at least one relay connector.

25. The lighting device according to claim 18, wherein:
the at least one pressing portion is provided in an end portion with respect to the direction along the board surface of the power supply board and perpendicular to the connecting direction and the disconnecting direction; and
the at least one pressed portion is provided in an end portion with respect to the direction along the board surface of the power supply board and perpendicular to the connecting direction and the disconnecting direction.

26. The lighting device according to claim 18, wherein:
the at least one pressing portion includes a plurality of pressing portions provided in end portions with respect to the direction along the board surface of the power supply board and perpendicular to the connecting direction and the disconnecting direction; and
the at least one pressed portion includes a plurality of pressed portions provided in end portions with respect to the direction along the board surface of the power supply board and perpendicular to the connecting direction and the disconnecting direction.

27. The lighting device according to claim 1, further comprising an attachment with which the movable portion is mounted to the chassis and held, wherein:
the movable portion has an attachment hole through which the attachment is passed; and
the attachment hole is formed such that a clearance is provided between an edge thereof and the attachment with respect to the connecting direction and the disconnecting direction.

28. The lighting device according to claim 27, wherein:
the power supply board is movable between a non-connected position and a connected position in one direction along the board surface thereof, the power supply board being disconnected from the at least one relay connector at the non-connected position and connected to the at least one relay connector at the connected position; and
the attachment hole is formed such that the clearance is substantially equal to or larger than a moving distance of the power supply board between the non-connected position and the connected position.

29. The lighting device according to claim 27, wherein:
the cover further includes a fixed portion and a flexible portion, the fixed portion being fixed to the chassis at a location closer to the at least one relay connector than the movable portion, the flexible portion being connected between the movable portion and the fixed portion, and capable of expanding and contracting in the connecting direction and the disconnecting direction of the power supply board; and
the attachment hole is formed such that an edge thereof is in contact with the attachment with the flexible portion expanded to any one of a maximum length and a length immediately before contraction starts so as to restrict a movement of the movable portion.

30. The lighting device according to claim 1, wherein the movable portion includes a positioning portion that is in contact with the power supply board and positions the power supply board with respect to the direction along the board surface of the power supply board and perpendicular to the connecting direction and the disconnecting direction.

31. The lighting device according to claim 1, wherein the movable portion includes a board support portion that projects toward the power supply board and is in contact with the power supply board so as to support the power supply board.

32. A display device, comprising:
the lighting device according to claim 1; and
a display panel configured to provide display using light from the lighting device.

33. The display device according to claim 32, wherein the display panel is a liquid crystal panel including liquid crystals sealed between substrates.

34. A television receiver comprising the display device according to claim 32.

* * * * *